United States Patent
Hill et al.

(10) Patent No.: US 10,527,183 B1
(45) Date of Patent: Jan. 7, 2020

(54) PRESSURE RELIEF VALVE

(71) Applicant: KHOLLE Magnolia 2015, LLC, Houston, TX (US)

(72) Inventors: Larry Mitchel Hill, Cypress, TX (US); William Brent Stroebel, Houston, TX (US); Scott Taylor Donaldson, Spring, TX (US); E. Lee Colley, III, Houston, TX (US)

(73) Assignee: KHOLLE Magnolia 2015, LLC, Houston, TX (US)

( * ) Notice: Subject to any disclaimer, the term of this patent is extended or adjusted under 35 U.S.C. 154(b) by 59 days.

(21) Appl. No.: 15/583,056

(22) Filed: May 1, 2017

(51) Int. Cl.
*F16K 17/40* (2006.01)
*F16K 17/14* (2006.01)
*F16K 31/122* (2006.01)
*F16K 17/16* (2006.01)
*F16K 17/38* (2006.01)
*F16K 17/32* (2006.01)

(52) U.S. Cl.
CPC ............ *F16K 17/14* (2013.01); *F16K 17/16* (2013.01); *F16K 17/1613* (2013.01); *F16K 17/32* (2013.01); *F16K 17/383* (2013.01); *F16K 31/1221* (2013.01); *Y10S 507/922* (2013.01)

(58) Field of Classification Search
CPC .. F16K 31/1221; F16K 17/0486; F16K 17/14; F16K 17/16; F16K 17/1613; F16K 17/383; F16K 17/32; Y10S 507/922
USPC ........... 137/68.3, 68.11, 68.13, 68.22, 68.29, 137/487.5
See application file for complete search history.

(56) References Cited

U.S. PATENT DOCUMENTS

| | | | | | |
|---|---|---|---|---|---|
| 2,387,353 | A | * | 10/1945 | Raymond | F16K 17/16 137/68.22 |
| 2,441,011 | A | * | 5/1948 | Dodelin | F16K 13/06 137/68.13 |
| 2,587,212 | A | * | 2/1952 | Placette | F16K 17/105 137/489.5 |
| 2,788,794 | A | * | 4/1957 | Holinger | F16K 17/16 137/613 |
| 2,895,492 | A | * | 7/1959 | Bell | F16K 17/16 137/340 |
| 3,008,479 | A | * | 11/1961 | Mancusi, Jr. | F16K 13/04 137/68.28 |
| 3,092,286 | A | * | 6/1963 | Duff | F16K 13/06 137/68.13 |
| 3,464,633 | A | * | 9/1969 | Potocnik | F16K 17/14 137/68.11 |

(Continued)

*Primary Examiner* — Minh Q Le
(74) *Attorney, Agent, or Firm* — Keith B. Willhelm

(57) ABSTRACT

Pressure relief valves may be tapped into flow lines. The pressure relief valves are normally shut and are adapted to open at a threshold pressure in the flow line. The valves comprise a body which is adapted to allow the valve to be tapped into the flow line. A passage is defined in the body. The passage provides a valve inlet and a valve outlet. The inlet is in fluid communication with the flow line. A sacrificial closure is disposed in the passage and blocks flow through the passage. The closure is exposed to fluid pressure in the flow line. The valve also comprises means for compromising the sacrificial closure in response to detection of the threshold pressure in the flow line. The integrity of the closure will be compromised such that fluid from the flow line may flow through the passage and out the valve outlet.

22 Claims, 17 Drawing Sheets

(56) References Cited

U.S. PATENT DOCUMENTS

| | | | | |
|---|---|---|---|---|
| 3,800,979 A * | 4/1974 | Piffath | ............. | B65D 83/14 |
| | | | | 137/322 |
| 3,902,515 A * | 9/1975 | Douglas | ............. | B01J 3/002 |
| | | | | 137/68.22 |
| 3,915,235 A * | 10/1975 | Hamilton | ............. | F16K 17/403 |
| | | | | 137/68.13 |
| 4,085,764 A * | 4/1978 | Raidl, Jr. | ............. | F16K 17/16 |
| | | | | 137/312 |
| 4,476,937 A | 10/1984 | Rozniecki | | |
| 4,580,589 A * | 4/1986 | Le Bras | ............. | F16K 13/04 |
| | | | | 137/68.25 |
| 4,805,802 A * | 2/1989 | MacKendrick | ............. | B63C 9/24 |
| | | | | 222/5 |
| 5,076,312 A * | 12/1991 | Powell | ............. | B60R 21/268 |
| | | | | 137/68.25 |
| 5,564,740 A * | 10/1996 | Zakula | ............. | B60R 21/272 |
| | | | | 222/5 |
| 5,583,490 A | 12/1996 | Santos et al. | | |
| 5,647,390 A * | 7/1997 | Wass | ............. | F16K 17/383 |
| | | | | 137/68.12 |
| 6,131,599 A | 10/2000 | DeGood et al. | | |
| 6,209,561 B1 | 4/2001 | Kugelev et al. | | |
| 6,604,541 B1 * | 8/2003 | Denning | ............. | F16K 17/162 |
| | | | | 137/492.5 |
| 7,143,776 B2 | 12/2006 | Sundholm | | |
| 7,373,944 B2 * | 5/2008 | Smith | ............. | F16K 17/38 |
| | | | | 137/68.13 |
| 7,878,215 B2 * | 2/2011 | McLelland | ............. | F16K 13/06 |
| | | | | 137/67 |
| 8,061,199 B2 | 11/2011 | DiRienzo, Jr. et al. | | |
| 8,354,934 B2 | 1/2013 | Walker et al. | | |
| 8,573,244 B2 | 11/2013 | Taylor | | |
| 9,169,705 B2 | 10/2015 | Helms et al. | | |
| 2009/0314355 A1 | 12/2009 | Szeglin | | |
| 2011/0240301 A1 * | 10/2011 | Robison | ............. | E21B 23/006 |
| | | | | 166/334.1 |
| 2014/0048255 A1 * | 2/2014 | Baca | ............. | E21B 33/068 |
| | | | | 166/250.1 |
| 2015/0107684 A1 | 4/2015 | Forkl et al. | | |
| 2015/0300513 A1 | 10/2015 | Smets | | |
| 2017/0051572 A1 * | 2/2017 | Penney | ............. | E21B 33/068 |
| 2017/0285668 A1 * | 10/2017 | Moseley | ............. | E21B 43/26 |
| 2018/0094495 A1 * | 4/2018 | Wardley | ............. | E21B 23/10 |
| 2018/0313455 A1 * | 11/2018 | Said | ............. | F16K 17/16 |

* cited by examiner

PRESSURE RELIEF VALVE

FIELD OF THE INVENTION

The present invention relates generally to pressure relief valves, and especially to pressure relief valves for fluid transportation systems conveying fluids under high pressure as are common, for example, in the oil and gas industry.

BACKGROUND OF THE INVENTION

Hydrocarbons, such as oil and gas, may be recovered from various types of subsurface geological formations. The formations typically consist of a porous layer; such as limestone and sands, overlaid by a nonporous layer. Hydrocarbons cannot rise through the nonporous layer, and thus, the porous layer forms an area or reservoir in which hydrocarbons will collect. A well is drilled through the earth until the hydrocarbon bearing formation is reached. Hydrocarbons then can flow from the porous formation into the well.

In what is perhaps the most basic form of rotary drilling methods, a drill bit is attached to a series of pipe sections referred to as a drill string. The drill string is suspended from a derrick and rotated by a motor in the derrick. A drilling fluid or "mud" is pumped down the drill string, through the bit, and into the well bore. This fluid serves to lubricate the bit and carry cuttings from the drilling process back to the surface. As the drilling progresses downward, the drill string is extended by adding more pipe sections.

When the drill bit has reached the desired depth, larger diameter pipes, or casings, are placed in the well and cemented in place to prevent the sides of the borehole from caving in. Cement is introduced through a work string. As it flows out the bottom of the work string, fluids already in the well, so-called "returns," are displaced up the annulus between the casing and the borehole and are collected at the surface.

Once the casing is cemented in place, it is perforated at the level of the oil-bearing formation to create openings through which oil can enter the cased well. Production tubing, valves, and other equipment are installed in the well so that the hydrocarbons may flow in a controlled manner from the formation, into the cased well bore, and through the production tubing up to the surface for storage or transport.

This simplified drilling and completion process, however, is rarely possible in the real world. Hydrocarbon bearing formations may be quite deep or otherwise difficult to access. Thus, many wells today are drilled in stages. An initial section is drilled, cased, and cemented. Drilling then proceeds with a somewhat smaller well bore which is lined with somewhat smaller casings or "liners." The liner is suspended from the original or "host" casing by an anchor or "hanger." A seal also is typically established between the liner and the casing and, like the original casing, the liner is cemented in the well. That process then may be repeated to further extend the well and install additional liners. In essence, then, a modern oil well typically includes a number of tubes telescoped wholly or partially within other tubes.

Moreover, hydrocarbons are not always able to flow easily from a formation to a well. Some subsurface formations, such as sandstone, are very porous. Hydrocarbons can flow easily from the formation into a well. Other formations, however, such as shale rock, limestone, and coal beds, are only minimally porous. The formation may contain large quantities of hydrocarbons, but production through a conventional well may not be commercially practical because hydrocarbons flow though the formation and collect in the well at very low rates. The industry, therefore, relies on various techniques for improving the well and stimulating production from formations. In particular, various techniques are available for increasing production from formations which are relatively nonporous.

One technique involves drilling a well in a more or less horizontal direction, so that the borehole extends along a formation instead of passing through it. More of the formation is exposed to the borehole, and the average distance hydrocarbons must flow to reach the well is decreased. Another technique involves creating fractures in a formation which will allow hydrocarbons to flow more easily. Indeed, the combination of horizontal drilling and fracturing, or "frac'ing" or "fracking" as it is known in the industry, is presently the only commercially viable way of producing natural gas from the vast majority of North American gas reserves.

Fracturing a formation is accomplished by pumping fluid, most commonly water, into the well at high pressure and flow rates. Proppants, such as grains of sand, ceramic or other particulates, usually are added to the fluid along with gelling agents to create a slurry. The slurry is injected into the formation, fracturing it and creating flow paths to the well. The proppant serves to prevent fractures from closing when pumping is stopped.

A formation typically will be fractured in many different locations or zones, but rarely, if ever, will it be fractured all at once. A liner first will be installed in the well. The liner will incorporate valves, or the liner may be perforated in a first zone near the bottom of the well. Fluids then are pumped into the well to fracture the formation in the vicinity of the bottom perforations. After the initial zone is fractured, a plug is installed in the liner at a point above the fractured zone. The liner is perforated again, this time in a second zone located above the plug. That process is repeated for zones further up the formation until the formation has been completely fractured.

Once the well is fractured, the large quantities of water and sand that were injected into the formation eventually must be allowed to flow out of the well. The water and sand will be separated from hydrocarbons produced by the well to protect downstream equipment from damage and corrosion. The production stream also may require additional processing to neutralize corrosive agents in the stream.

Systems for successfully completing a fracturing operation, therefore, are extensive and complex, as may be appreciated from FIG. 1. Water from tanks 1 and gelling agents dispensed by a chemical unit 2 are mixed in a hydration unit 3. The discharge from hydration unit 3, along with sand carried on conveyors 4 from sand tanks 5 is fed into a blending unit 6. Blender 6 mixes the gelled water and sand into a slurry. The slurry is discharged through low-pressure hoses 7 which convey it into two or more low-pressure lines 8 in a frac manifold 9. The low-pressure lines 8 in frac manifold 9 feed the slurry to an array of pumps 10, perhaps as many as a dozen or more, through low-pressure "suction" hoses 11.

Pumps 10 take the slurry and discharge it at high pressure through individual high-pressure "discharge" lines 12 into two or more high-pressure lines or "missiles" 13 on frac manifold 9. Missiles 13 flow together, i.e., they are manifolded on frac manifold 9. Several high-pressure flow lines 14 run from the manifolded missiles 13 to a "goat head" 15. Goat head 15 delivers the slurry into a "zipper" manifold 16 (also referred to by some as a "frac manifold"). Zipper manifold 16 allows the slurry to be selectively diverted to, for example, one of two well heads 17. Once fracturing is complete, flow back from the fracturing operation discharges into a flowback manifold 18 which leads into flowback tanks 19.

Frac systems are viewed as having "low-pressure" and "high-pressure" sides or, more simply, as having low sides and high sides. The low side includes the components upstream of the inlet of pumps 10, e.g., water tanks 1, hydration unit 3, blending unit 6, and the low-pressure lines 8 of frac manifold 9, which operate under relatively low pressures. The high side includes all the components downstream of the discharge outlets of pumps 10, e.g., the high-pressure missiles 13 of frac manifold 9 and flow lines 14 running to goat head 15, which operate under relatively high pressures.

The flow lines and units making up the high-side of a frac system, such as pump discharge lines 12 and flow line 14, typically are assembled from a large number of individual components often referred to as "frac iron," "flow iron," or "ground iron." Such components include straight steel pipe, fittings for splitting, combining, or changing direction of a line, gauges and other monitoring equipment, and valves and other control devices. Flow iron components are fabricated from heavy, high tensile steel and are quite rugged. They may be rated for high-pressure service up to 20,000 psi.

Nevertheless, flowline components can suffer shortened service life or failure due to the harsh conditions to which they are exposed. Not only are fluids pumped through the system at very high pressure and flow rates, but the fluid is abrasive and corrosive. Components may suffer relatively rapid erosion. The high flow rates and pressures also create vibrations through the system and exacerbate and concentrate stress on the components. The resulting strain may create fractures in the components which can propagate and lead to failure, especially in areas weakened by erosion and corrosion.

Frac jobs also have become more extensive, both in terms of the pressures required to fracture a formation and the time required to complete all stages of an operation. Prior to horizontal drilling, a typical vertical well might require fracturing in only one, two or three zones at pressures usually well below 10,000 psi. Fracturing a horizontal well, however, may require fracturing in 20 or more zones. Horizontal wells in shale formations such as the Eagle Ford shale in South Texas typically require fracturing pressures of at least 9,000 psi and 6 to 8 hours or more of pumping. Horizontal wells in the Haynesville shale in northeast Texas and northwest Louisiana require pressures around 13,500 psi. Pumping may continue near continuously—at flow rates of 2 to 3 thousand gallons per minute (gpm)—for several days before fracturing is complete.

Any failure of flowline components on site may interrupt fracturing, potentially reducing its effectiveness and inevitably increasing the amount of time required to complete the operation. Moreover, if a component fails, large quantities of fluid can be ejected at very high pressures, causing the components to move violently and potentially injure workers. Flowline components must be certified and periodically inspected and recertified, but not all damage to or weakening of the components may be detected. Fatigue stress and microscopic fracturing is difficult to detect and can lead to catastrophic failure.

Consequently, and especially in respect to the high-side of a system, if operating pressures exceed the pressure rating of a flow line at any point, operators typically will simply scrap any component that was exposed to above-rated pressures. That can add up to significant cost. Having been designed and manufactured for such harsh operating conditions, flow iron components are quite expensive, especially components rated for high pressures. Operators, therefore, invariably incorporate valves for releasing pressure from a line before the rated pressure is exceeded.

One general approach is use an automatically controlled valve which can be opened and shut, such as a needle, globe, plug, or gate valve. The valve is tapped into the line, as is a transducer or other sensor capable of detecting pressure. The pressure sensor is connected to a controller which will open the valve if excess pressure is detected. Once excess pressure has bled off and rated pressures are restored, the controller will shut the valve again.

Pressure transducers are capable of measuring pressures with accuracy and precision. Thus, automatic valves can reliably open a valve when pressures in the line actually exceed rated pressures, but will not open when rated pressures are not exceeded. On the other hand, valves that can be cycled open and closed, and especially their valve seats, are more susceptible to wear and damage. Thus, once opened, they may not fully set and seal, and effectively shut the valve again.

Self-actuating valves, essentially check valves, also are employed. A valve element, such as a needle or globe element, is exposed to pressure in a flow line, but is held against a seat by a spring or compressed gas. Such valves, however, are extremely difficult to calibrate. Thus, they frequently will actuate above or below their rated pressures. They also are subject to wear and damage which can prevent them from setting and sealing once they have been in service for a period of time.

Another general approach is to use valves with a sacrificial closure, most commonly a burst valve. Such valves are not opened and closed in the common sense of the words. The sacrificial closure is intended for one use only. A burst disc, for example, may be used to shut off a passage through the valve. The burst disc is designed to burst when a specified pressure is exceeded, thus opening the passage and allowing the line to bleed off fluid. Once the disc has burst, a burst valve will remain "open" until a new disc is installed.

Valves with sacrificial closures also can provide accurate and precise release of excessive pressures. The degree of control, however, depends on how reliably and consistently the burst disc or other closure fails. Burst discs in particular may be manufactured to precise specifications with very close tolerances, but are relatively expensive. Lower tolerance burst discs are significantly cheaper. If used, however, they must be rated well below a desired threshold pressure to ensure that they fail when required. Necessarily, then, they may frequently burst below rated pressures and cause unnecessary disruption of the fracturing process. Moreover, burst discs have a shelf life beyond which they will not perform to specification, and the higher the tolerance the shorter the shelf life.

The statements in this section are intended to provide background information related to the invention disclosed and claimed herein. Such information may or may not constitute prior art. It will be appreciated from the foregoing, however, that there remains a need for new and improved pressure release valves and methods for protecting high-pressure flowlines from excessive pressure. Such disadvantages and others inherent in the prior art are addressed by various aspects and embodiments of the subject invention.

SUMMARY OF THE INVENTION

The subject invention, in its various aspects and embodiments, relates generally to pressure relief valves and encompasses various embodiments and aspects, some of which are specifically described and illustrated herein. One broad aspect of the invention provides for a pressure relief valve for high-pressure fluid transportation systems. The pressure relief valve is normally shut and adapted to open at a threshold fluid pressure. The pressure relief valve comprises a body, a passage, a sacrificial closure, and means for compromising the sacrificial closure. More particularly, the body is adapted for connection to a fluid conduit in the system. The passage is defined in the body and provides a valve inlet and a valve outlet. The inlet is in fluid communication with the conduit. The sacrificial closure may be a penetrable closure, such as a metal rupture disc, or a frangible closure, such as a frangible disk or bead. It may be an displaceable closure, such as an extrudable plug. In any event, the sacrificial closure blocks flow through the passage and is exposed to fluid pressure in the conduit. The means for compromising the sacrificial closure actuate in response to detection of the threshold pressure in the conduit whereby fluid from the conduit may flow through the passage and out the valve outlet.

Other embodiments provide pressure relief valves for high-pressure fluid transportation systems which are normally shut and adapted to open at a threshold fluid pressure. The pressure relief valve comprises a body, a passage, a sacrificial closure, and a linear actuator. The body is adapted for connection to a fluid conduit in the system. The passage is defined in the body and provides a valve inlet and a valve outlet. The inlet is in fluid communication with the conduit. The sacrificial closure blocks flow through the passage and is exposed to fluid pressure in the conduit. The linear actuator is actuatable in response to detection of the threshold pressure in the conduit to move from a retracted position to an extended position in which extended position the actuator engages the closure to open the passage. Thus, fluid from the conduit may flow through the passage and out the valve outlet.

Additional embodiments are directed to such valves where the actuator comprises a dart and the closure is a penetrable closure. Upon actuation of the actuator the dart penetrates the closure. Similar embodiments include valves where the closure comprises a metal rupture disk and the dart pierces the rupture disk or where the closure comprises a frangible plug, such as a glass or ceramic ball or disk, and the dart fractures the frangible plug.

Still other aspects are directed to such pressure relief valves where the closure is a displaceable closure and the actuator comprises a rain. Upon actuation of the actuator the ram displaces the closure from the passage. Similar embodiments include valves were the closure is an elastomeric plug and the ram extrudes the plug.

In other aspects and embodiments, the invention provides such pressure relief valves where the actuator comprises a pneumatic or hydraulic cylinder.

Additional embodiments include pressure relief valves where the actuator comprises a pneumatic cylinder and the valve is operably connected to an actuation system. The actuation system comprises a pressure detector, a control valve, and a controller. The pressure detector is adapted to measure fluid pressure in the conduit. The control valve controls flow from a source of pressurized gas to the pneumatic cylinder. The controller is adapted to receive signals from the detector and to open the control valve in response to a predetermined fluid pressure in the conduit.

Further embodiments include pressure relief valves where the actuator comprises a hydraulic cylinder and the valve is operably connected to an actuation system. The actuation system comprises a pressure detector, a control valve, and a controller. The pressure detector is adapted to measure fluid pressure in the conduit. The control valve controls flow from a source of pressurized hydraulic fluid to the hydraulic cylinder. The controller is adapted to receive signals from the detector and to open the control valve in response to a predetermined fluid pressure in the conduit.

Still other aspects include pressure relief valves where the actuator comprises first and second fluid cylinder and the valve is operably connected to an actuation system. The actuation system comprises a pressure detector, first and second control valves, and a controller. The pressure detector is adapted to measure fluid pressure in the conduit. The first control valve controls flow from a source of pressurized fluid to the first fluid cylinder. The second control valve controls flow from a source of pressurized fluid to the second fluid cylinder. The controller is adapted to receive signals from the detector and to open the first control valve in response to a predetermined fluid pressure in the conduit, whereby the actuator is actuated to move to its extended position into engagement with the closure to open the passage, and to open the second control valve in response to a second predetermined fluid pressure in the conduit, whereby the actuator is actuated to move to its retracted position. The first and second control valves may be a single valve, such as a three-way valve having a shut position and two open positions.

The subject invention, in other aspects and embodiments, also is directed to pressure relief valves where the valve is normally shut and is adapted to open at a threshold fluid pressure. The pressure relief valve comprises a body, a passage, a sacrificial closure, and a shaped charge. The body is adapted for connection to a fluid conduit in the system. The passage is defined in the body and provides a valve inlet and a valve outlet. The inlet is in fluid communication with the conduit. The sacrificial closure blocks flow through the passage and is exposed to fluid pressure in the conduit. The shaped charge is actuatable in response to detection of the threshold pressure in the conduit to direct kinetic energy sufficient to compromise the integrity of the sacrificial closure and thereby to open the passage. Thus, fluid from the conduit may flow through the passage and out the valve outlet.

Other embodiments provide such valves where the sacrificial closure is a metal rupture disk, a frangible ball or disk, or a plug.

Yet other embodiments provide such valves which are operably connected to an actuation system. The actuation system comprises a pressure detector and a controller. The pressure adaptor is adapted to measure fluid pressure in the conduit. The controller is adapted to receive signals from the detector and to ignite the shaped charge in response to a predetermined fluid pressure in the conduit.

In various other aspects, the subjection invention is directed to pressure relief valves which are normally shut and are adapted to open at a threshold fluid pressure. The pressure relief valves comprise a body, a passage, and first and second sacrificial closures. The body is adapted for connection to a fluid conduit in the system. The passage is defined in the body and provides a valve inlet and a valve outlet. The inlet is in fluid communication with the conduit. The first sacrificial closure is exposed to fluid pressure in the conduit and blocks flow through the passage at fluid pressures below a first rated pressure. The second sacrificial closure is downstream from the first closure and blocks flow through the passage at fluid pressures below a second rated pressure. The first and second closures define a chamber having a port allowing fluid to flow in and out of the chamber. The chamber has a relievable internal fluid pressure. The first rated pressure is less than the threshold pressure. The second rated pressure is less than the threshold pressure. The chamber pressure is less than the first and second rated pressures and greater than the difference between the threshold pressure and the first rated pressure. Thus, the pressure differential across the first sacrificial closure at the threshold pressure is less than the first rated pressure. The chamber pressure is relievable in response to detection of the threshold pressure in the conduit. Relieving the chamber pressure, therefore, will cause the pressure differential to increase above the first rated pressure, allowing in turn fluid pressure from the conduit to open in sequence the first and second closures.

Other embodiments provide such valves where the sacrificial closure is a metal rupture disk, a frangible closure, or an extrudable closure.

Yet other embodiments provide such valves which are operably connected to an actuation system. The actuation system comprises a pressure detector and a controller. The pressure adaptor is adapted to measure fluid pressure in the conduit. The controller is adapted to receive signals from the detector and to relieve the pressure from the chamber in response to a predetermined fluid pressure in the conduit.

The subject invention, in still other aspects and embodiments, is directed flow lines for a high-pressure fluid transportation system which comprise the novel pressure relief valves. Other embodiments are directed to fluid transportation systems, such a systems for fracturing a well, which incorporate the novel flow lines. Still other embodiments are directed to high-pressure fluid transportation system, such as a system for fracturing a well, which comprises first and second pressure bleed-off tap lines. Each tap line is connected to a high-pressure fluid conduit in the system and comprises a shutoff valve controlling flow through the tap line and a novel pressure relief valve.

The subject invention also includes methods for controlling flow through a fluid transportation system, such as a system for fracturing a well, and especially to methods for relieving excess pressure in such systems. The method comprises installing the novel pressure relief valves in fluid communication with a fluid conduit in the system and opening the valve when a threshold pressure is exceeded in the fluid conduit.

Finally, still other aspects and embodiments of the invention provide apparatus and methods having various combinations of such features as will be apparent to workers in the art.

Thus, the present invention in its various aspects and embodiments comprises a combination of features and characteristics that are directed to overcoming various shortcomings of the prior art. The various features and characteristics described above, as well as other features and characteristics, will be readily apparent to those skilled in the art upon reading the following detailed description of the preferred embodiments and by reference to the appended drawings.

Since the description and drawings that follow are directed to particular embodiments, however, they shall not be understood as limiting the scope of the invention. They are included to provide a better understanding of the invention and the manner in which it may be practiced. The subject invention encompasses other embodiments consistent with the claims set forth herein.

Figure 1:
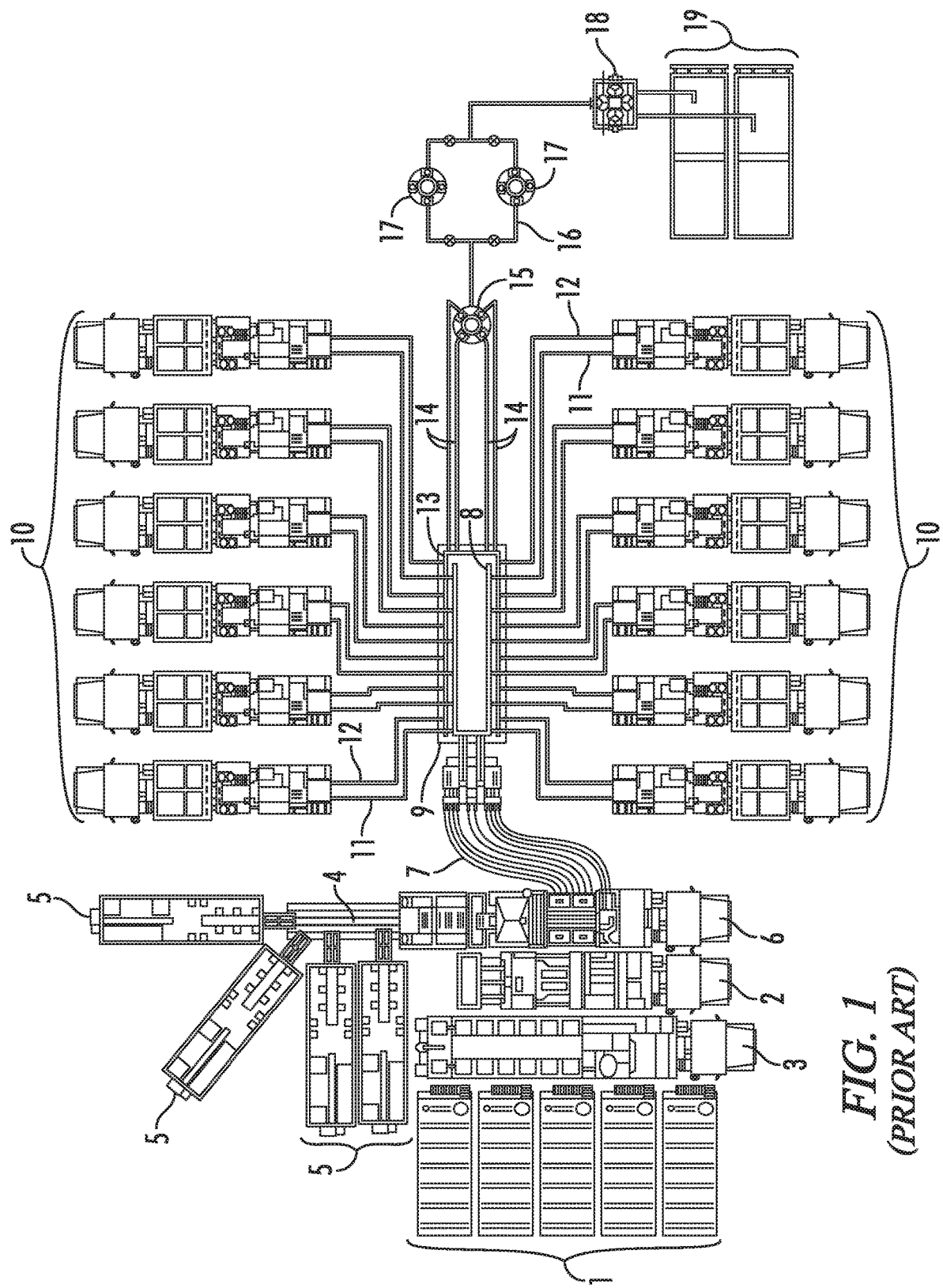
FIG. 1 (prior art) is a schematic view of a system for fracturing a well and receiving flowback from the well, which system includes various high-pressure flow lines, such as flow lines 12 and 14.

In the drawings and description that follows, like parts are identified by the same reference numerals. The drawing figures are not necessarily to scale. Certain features of the embodiments may be shown exaggerated in scale or in somewhat schematic form and some details of conventional design and construction may not be shown in the interest of clarity and conciseness.

DESCRIPTION OF ILLUSTRATIVE EMBODIMENTS

The subject invention, in various aspects and embodiments, is directed generally to pressure relief valves for flowlines, and especially for high-pressure flowlines. One or more specific embodiments will be described below. In an effort to provide a concise description of the embodiments, all features of an actual implementation may not be described or illustrated. It should be appreciated that in the development of any such actual implementation, as in any engineering or design project, numerous implementation-specific decisions must be made to achieve a developers' specific goals, such as compliance with system-related and business-related constraints. Those goals may vary from one implementation to another. Moreover, it should be appreciated that such development efforts might be complex and time consuming, but nevertheless would be a routine undertaking of design, fabrication, and manufacture for those of ordinary skill having the benefit of this disclosure.

Broad embodiments of the novel valves are directed to valves which may be tapped into flow lines. They are normally shut and are adapted to open at a threshold pressure in the flow line. The valves comprise a body which is adapted to allow the valve to be tapped into the flow line. A passage is defined in the body. The passage provides a valve inlet and a valve outlet. The inlet is in fluid communication with the flow line. A sacrificial closure is disposed in the passage and blocks flow through the passage. The closure is exposed to fluid pressure in the flow line. The valve also comprises means for compromising the sacrificial closure in response to detection of the threshold pressure in the flow line. The integrity of the closure will be compromised such that fluid from the flow line may flow through the passage and out the valve outlet.

The novel pressure relief valves may be used in a variety of systems. They are particularly useful in high pressure flow lines as are common in chemical and other industrial plants, on marine dredging vessels, strip mines, and especially in the oil and gas industry. Certain embodiments are particularly well suited as components of temporary pipe and flow line installations. Hydraulic fracturing systems, such as those shown in FIG. 1, are a very common application where pressure relief valves are a practical necessity. They may be tapped into the high-pressure side of a frac system. If operating pressures approach the maximum pressure rating, the valve can bleed off fluid and reduce pressure in the high-pressure side before the rated pressure is exceeded.

Figure 2:
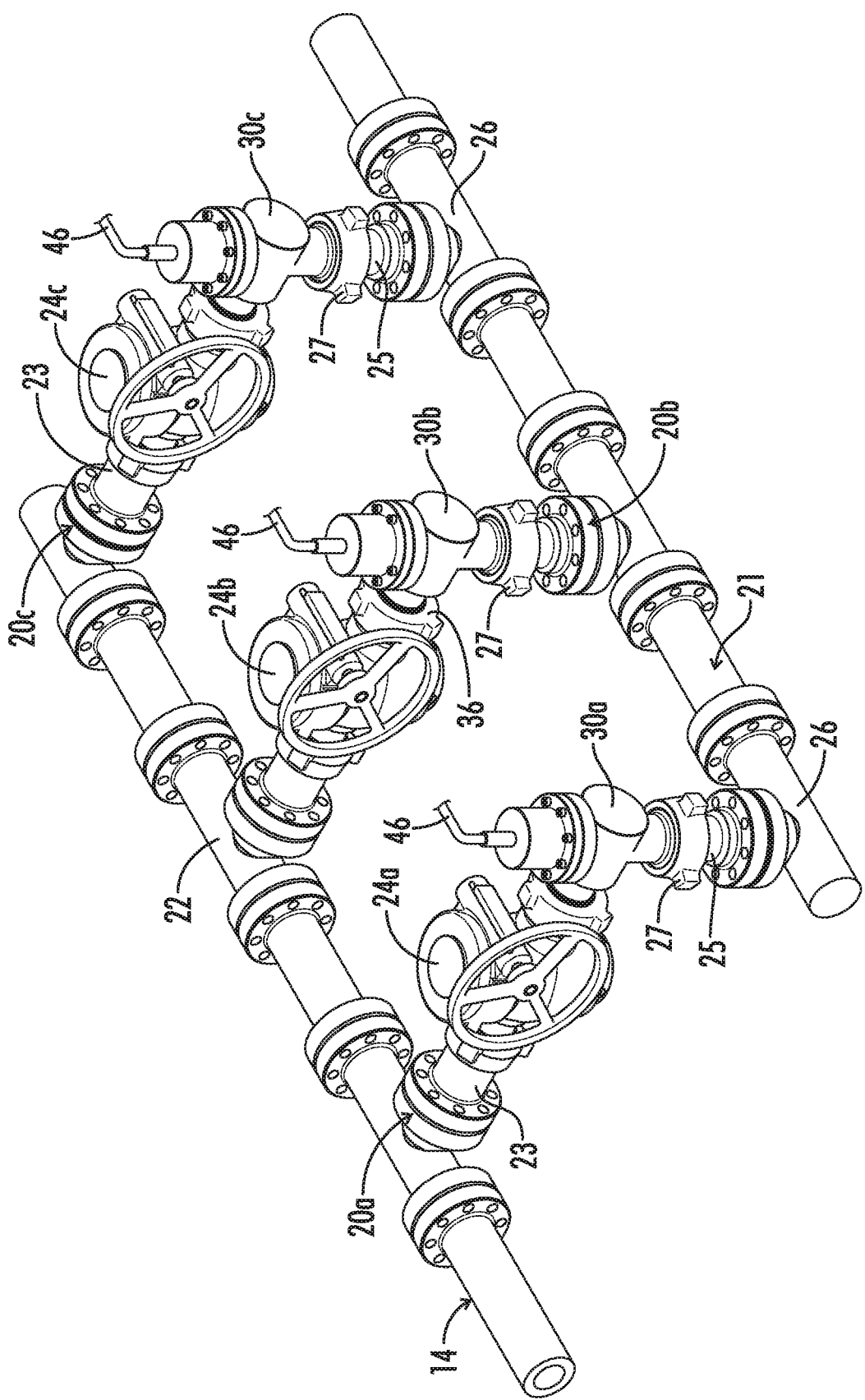
FIG. 2 is an isometric view of an installation of three first preferred embodiments 20 of the pressure relief valves of the subject invention, valves 30 being tapped into a high pressure flow line 14 of the fracturing system shown in FIG. 1.

For example, as illustrated in FIG. 2, the novel pressure relief valves may be tapped into one of the high-pressure flow lines 14 which run from manifold 9 to goat head 15 in the frac systems shown in FIG. 1. As described in detail below, the novel pressure relief valves incorporate a sacrificial closure. Once the closure has been compromised to "open" the valve and release pressure from flow line 14, the valves cannot be "closed" in the traditional sense. They will be rebuilt, that is, a new sacrificial closure will be installed in the valve.

Thus, an array of novel valves, such as a first preferred embodiment 30, typically will be tapped into flow line 14. For example, as shown in FIG. 2, three valves 30 may be connected in parallel to flow line 14 via three tap lines 20. Each tap line 20 is controlled by a shutoff valve 24. Initially, a single valve 30 will be on line, e.g., valve 30a. If pressure in flow line 14 exceeds rated pressure valve 30a will allow excess pressure to bleed off. Once rated pressure is restored, valve 30a will be taken off line by closing shutoff valve 24a, and another valve 30, e.g. valve 30b will be brought online by opening shutoff valve 24b.

Only a small portion of flow line 14 is shown in FIG. 2. It will be appreciated, however, that flow lines such as flow line 14 are assembled from a large number of heavy steel components, most of which are not illustrated. The components may include sections of straight steel pipe, various fitting, and monitoring and control equipment. Being intended for temporary installation, those components will be joined by unions. Unions allow the components to be connected ("made up") and disconnected ("broken down") relatively quickly.

The three types of unions commonly used in frac systems are hammer (or "Weco®") unions, clamp (or "Greyloc®") unions, and flange unions. Though spoken of in terms that may imply they are discreet components, unions are actually interconnected subassemblies of the components joined by the union. A male sub will be on one component, and a mating female sub will be on the other. The subs then will be connected to each other to provide the union.

In any event, as shown in FIG. 2, each pressure relief valve 30 is incorporated into its own tap line 20 running from high-pressure flow line 14 to a bleed-off line 21. More particularly, flow line 14 incorporates tee fittings 22. Tee fittings 22 are assembled into flow line 14 via flange unions. A flange-to-hammer union adaptor 23 is joined to the branch connection of tee fitting 22. Plug valve 24 is joined to adaptor 23 via a hammer union, and novel pressure relief valve 30 is joined to plug valve 24 by hammer unions as well. Pressure relief valve 30 is joined by a hammer union to a hammer-to-flange adaptor 25 which in turn is joined to flanged tee fitting 26 in bleed-off line 21. Bleed-off line 21 typically will discharge into a tank or pit (not shown) in the event fluid is diverted through tap lines 20. It will be appreciated, of course, that the components of the bleed-off tap line 20 may be joined or assembled by other connections. If desired, any of the components may be assembled with flange, hammer, or clamp unions, by threaded connections, or any other conventional assembly methods.

Figure 3:
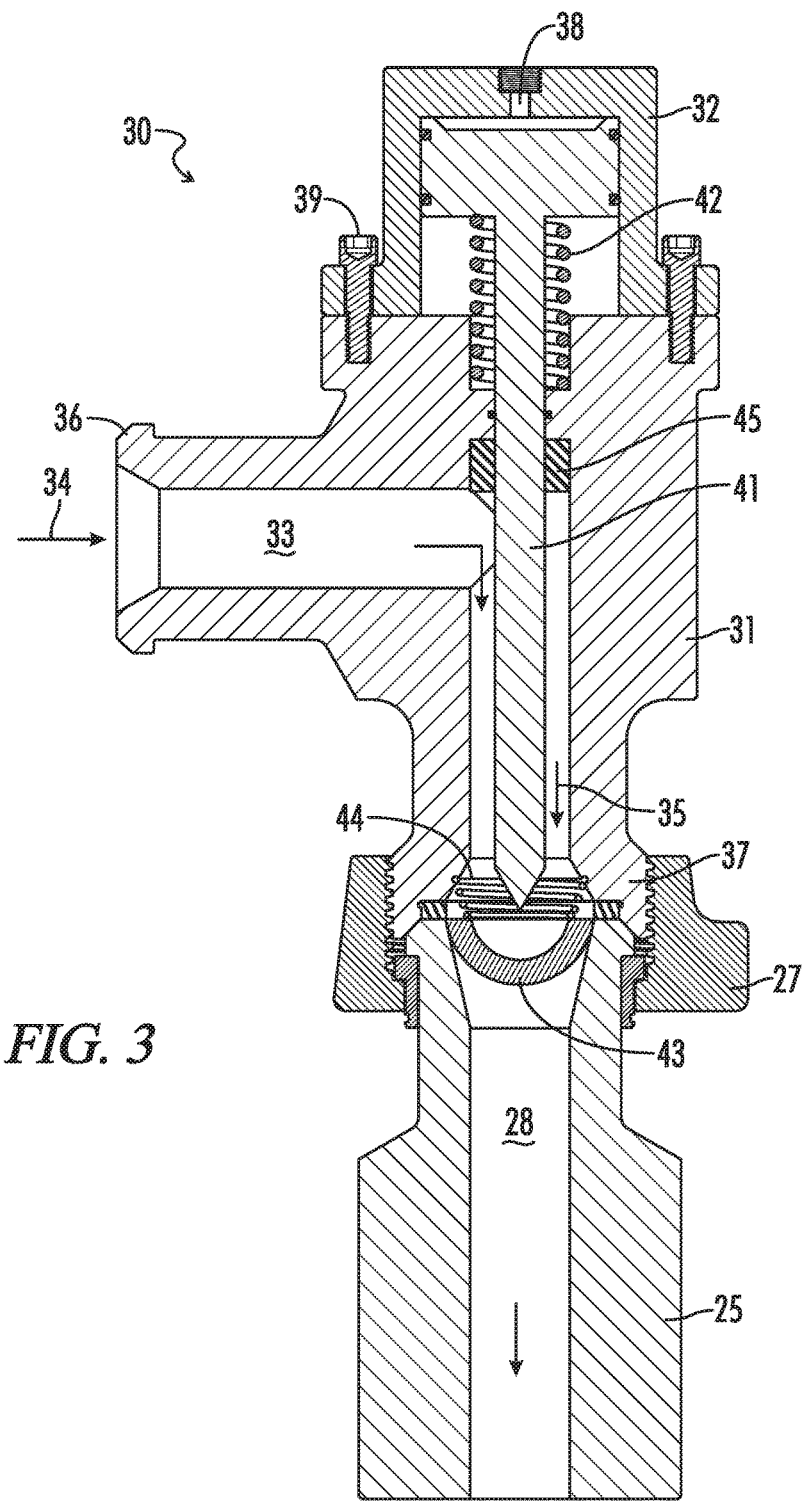
FIG. 3 is a cross-sectional view of first preferred pressure relief valve 30 shown in FIG. 2, which pressure relief valve 30 incorporates a rupture disc 43.
Figure 4:
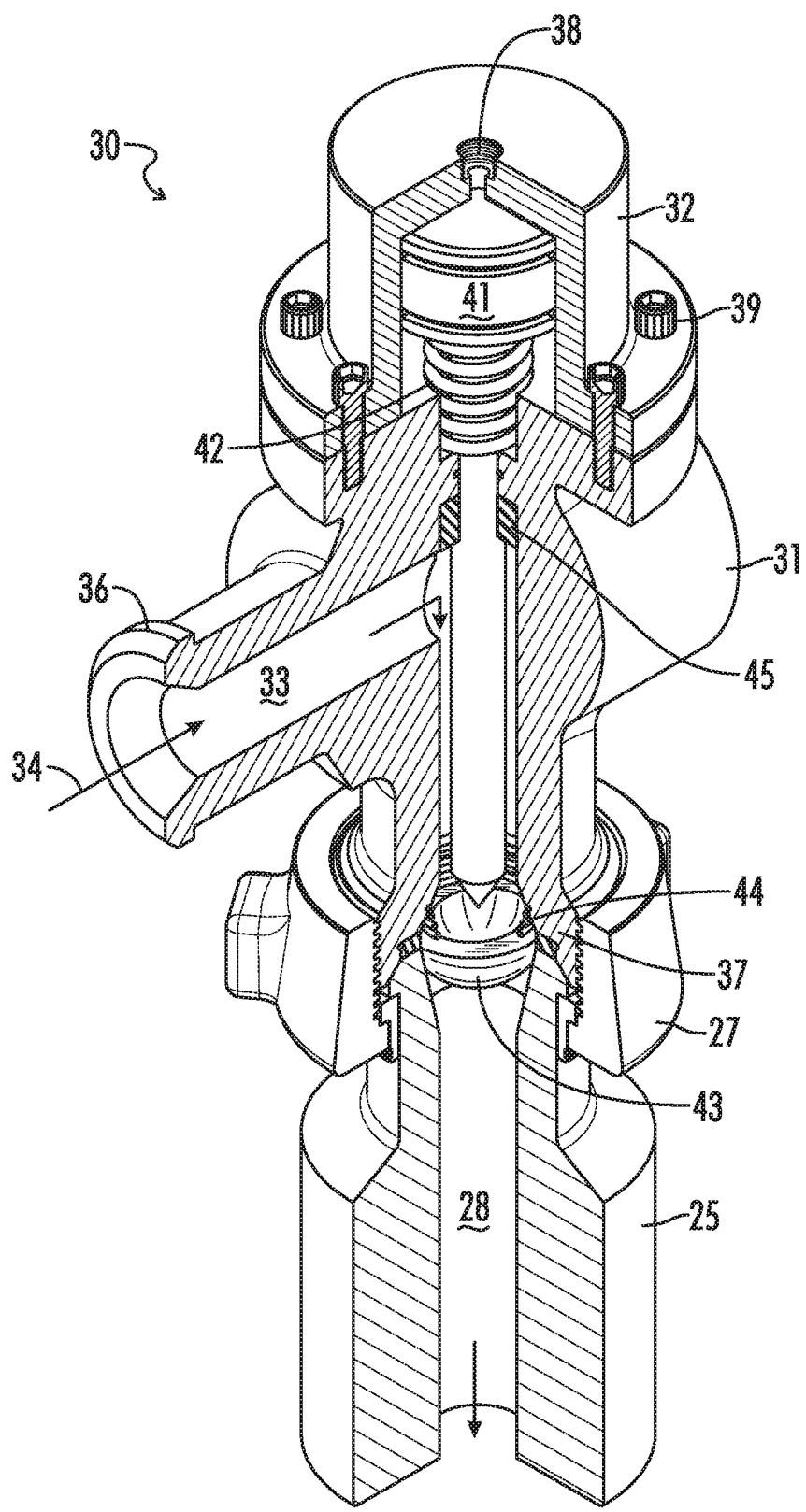
FIG. 4 is an isometric, partial quarter-sectional view of pressure relief valve 30 shown in FIG. 3.

First preferred pressure relief valve 30 is shown in greater detail in FIGS. 3-4. Those figures show valve 30 in its normally closed state, i.e. the state in which it will be assembled into tap line 20. As shown therein, valve 30 generally comprises a valve body 31 and a bonnet 32. Valve body 31 and bonnet 32 provide a housing for various internal components of valve 30, namely, a dart 41, a return spring 42, a burst or rupture disc 43, and a retaining spring 44.

As its name implies, body 31 comprises the major portion of valve 30 and defines many of its primary features. In particular, body 31 is provided with a generally cylindrical, L-shaped passage 33 extending between a valve inlet 34 and a valve outlet 35. Passage 33, when valve 30 is opened as described further below, provides a conduit for fluids conveyed by tap line 20 to reduce pressure in flow line 14. Inlet 34 is provided with a male hammer union sub 36 (partially shown in FIGS. 3-4). Male sub 36 facilitates assembly of valve 30 into tap line 20, e.g., by joining inlet 34 of valve 30 to the outlet of plug valve 24. Outlet 35 is provided with a female hammer union sub 37 which facilitates assembly of valve 30 into tap line 20, e.g., by joining outlet 35 of valve 30 to the inlet of adaptor 25.

Bonnet 32, as described further below, provides a generally cylindrical fluid chamber. A port 38 is provided at the top of bonnet 32. Port 38 allows fluid to flow into and out of the fluid chamber. A fluid feed line 46 (shown partially in FIG. 2) will be connected to port 38, e.g., by a threaded fitting which may be screwed into port 38. Bonnet 32 preferably is removably assembled to body 31, e.g., by threaded bolts 39, to facilitate assembly and rebuilding of valve 30. Any suitable means of securing bonnet 32 to body 31 may be used.

Rupture disc 43 provides a sacrificial closure which blocks flow beyond passage 33 when valve 30 is in its normally closed state. More specifically, as may be seen in FIGS. 3-4, disc 43 is carried more or less within passage 33 at the union between female sub 37 of valve 30 and a male hammer union sub 27 of adaptor 25. When valve 30 is tapped into flow line 14 fluid pressure will cause disc 43 to seat and seal against a tapered, inlet portion of a passage 28 in adaptor 25. Elastomeric seals, seats, or other sealing members (not shown) may be provided to enhance the seal between rupture disc 43 and the inlet of passage 28. Retaining spring 44 or another suitable retainer preferably is provided to ensure that disc 43 remains properly seated until valve 30 is tapped into flow line 14. It will be appreciated, however, that rupture disc 43 may be mounted elsewhere and in a variety of ways such that it blocks fluid flow beyond passage 33.

Rupture disc 43 preferably is fabricated from metal, such as stainless steel grade 316, Inconel® (nickel alloy 600), Monel® (nickel alloy 400), Hastelloy® C-276, and other steel alloys. Other metals may be used, however, as desired. High tensile strength engineering plastics also may be used, such as polycarbonates and Nylon 6, Nylon 66, and other polyamides, including fiber reinforced polyamides such as Reny polyamide. "Super" engineering plastics, such as polyether ether ketone (PEEK) and polyetherimides such as Ultem® may be particularly suitable.

It will be noted that disc 43 is a forward acting or tension type rupture disc. That is, load is applied to a concave side of disc 43 and the tensile strength of disc 43 determines burst pressure. Flat tension discs may be used, as may be reverse action rupture discs. In reverse action discs pressure is applied against a convex side of the disc, placing the disc under compression. The load strength of the disc determines burst pressure. Disc 43 also, as is typical, may include various scoring patterns to control the manner in which the disc ruptures. For example, scores may be used to create one or more hinges such that debris from the disc is not carried along with fluid that may be recycled into a fracturing operation.

Valve 30 incorporates a reciprocating linear actuator. That is, dart 41 in essence is a piston which is driven alternately by fluid and mechanical force. It has an enlarged, generally cylindrical end which is closely fitted within bonnet 32 for linear movement through the fluid chamber. The enlarged end of dart 41 divides the fluid chamber into an upper and a lower chamber. An elongated shaft extends from the enlarged upper end of dart 41. Suitable seals, such as elastomeric O-rings, and a packing 45 preferably are provided to seal around the enlarged end of dart 41 and its shaft.

As noted, FIGS. 3-4 show valve 30 in its normally closed state. Dart 41 is in its retracted (upper as shown in the figures) position. The shaft of dart 41 extends through an opening in body 31 into and through the substantial length of passage 33—but short of rupture disc 43. Return spring 42 is a coiled spring which is loaded under compression to bias dart 41 towards its retracted position. Rupture disc 43 is exposed to fluid pressure in flow line 14 via tap line 20, but it shuts off flow beyond passage 33 of valve 30 into bleed-off line 21.

Valve 30, in the event that excess pressure is detected in flow line 14, may be opened by actuating dart 41. More specifically, fluid may be introduced through port 38 into the upper fluid chamber of bonnet 32. As fluid flows into the upper fluid chamber, dart 41 will be urged downward towards an extended position. In its extended position, it will have engaged and punctured or otherwise induced rupturing of disc 43. The tip of dart 41 preferably, as shown, is pointed to facilitate that process. Once the structural integrity of rupture disc 43 has been compromised, fluid is able to pass through valve 30 and into bleed-off line 21. Return spring 42 then will urge dart 41 to return to its retracted, normal position.

Figure 5:
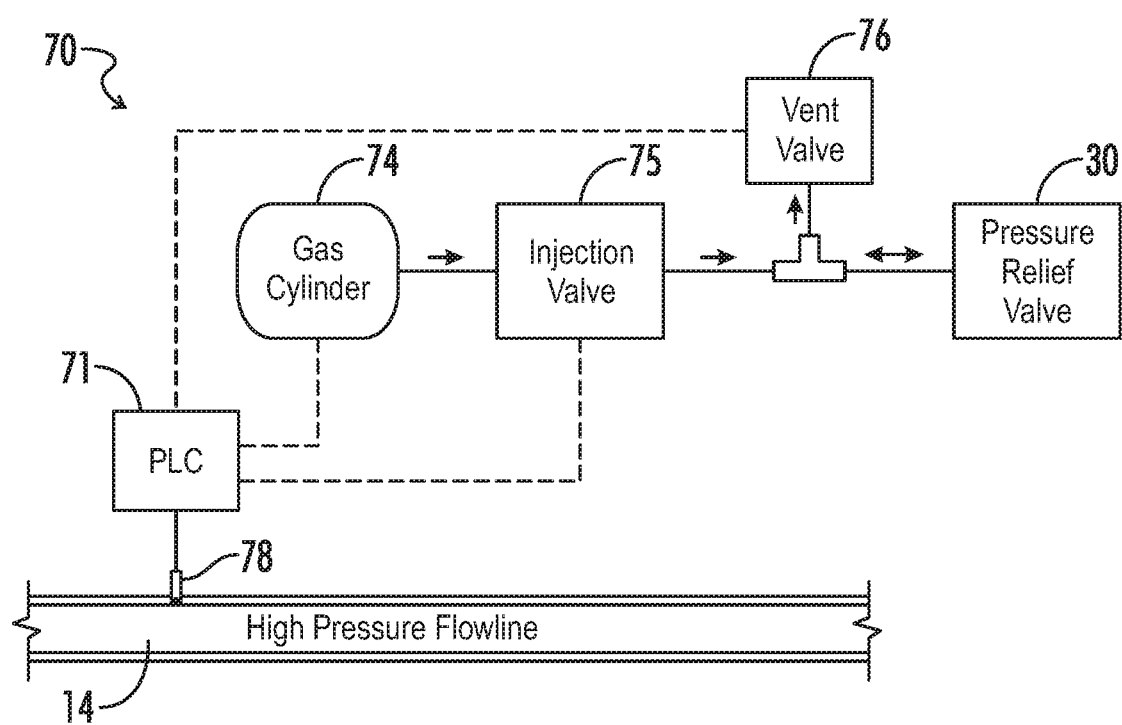
FIG. 5 is a schematic representation of a first preferred system 70 for pneumatically controlling pressure relief valve 30 and other embodiments of the novel pressure relief valves.

Actuation of dart 41 and opening of valve 30 may be described in further detail by reference to FIG. 5 which shows schematically a first preferred system 70 for controlling and operating valve 30. Control system 70 is an electronically controlled pneumatic system generally comprising a controller 71, a source 74 of compressed gas, an injection valve 75, a vent valve 76, and a pressure sensor 78.

Controller 71 preferably is a programmable logic controller or other programmable digital computer such as a laptop. Compressed gas source 74 may be a cylinder of compressed gas such as nitrogen or air. Typically, it will incorporate a regulator. Dryers and recharging pumps also may be provided, especially if air will be used as the source of compressed gas. Injection valve 75 and vent valve 76 preferably are solenoid valves. They are normally shut, but are connected to and may be opened and shut by controller 71. Sensor 78 is a pressure transducer or other conventional sensor for measuring fluid pressure. It is mounted in flow line 14 and connected to controller 71.

When valve 30 in installed and tapped into flow line 14, signals from pressure sensor 78 will be monitored by controller 71 and compared to a predetermined pressure. The predetermined pressure will correspond to the pressure rating of flow line 14 and the high-pressure side of the frac system. When pressures in excess of the predetermined pressure are detected, controller 71 will open normally shut injection valve 75 allowing compressed gas to flow from gas cylinder 74 through connecting feed lines and into valve 30. More specifically, as described above, compressed gas will be delivered through port 38 into the upper fluid chamber in valve 30 so that dart 41 is actuated, disc 43 is compromised, and valve 30 is opened.

Once valve 30 has been opened, controller 71 will shut injection valve 75 and open vent valve 76. That may be done after a predetermined time lapse, in response to detection of a pressure drop in flow line 14 by pressure sensor 78, or by detection of fluid pressure downstream of valve 30 by an additional pressure sensor (not shown). In any event, once injection valve 75 is closed and vent valve 76 is opened, spring 42 will cause dart 41 to return to its retracted position, forcing gas out of valve 30 through feed lines and out vent valve 76. Vent valve 76 then will be shut by controller 71, e.g., in response to a predetermined time lapse.

As noted, rupture disc 43 provides a sacrificial closure, and valve 30 must be rebuilt after it has been opened. Thus, as shown in FIG. 2, an array of valves 30 preferably will be tapped into a flow line, such as flow line 14 of the illustrated frac system. Initially, for example, only plug valve 24*a* will be opened and valve 30*a* will be online. Plug valves 24*b* and 24*c* will be closed, taking valves 30*b* and 30*c* offline. If pressure in flow line 14 threatens to the maximum rated pressure of the system, therefore, valve 30*a* will be opened allowing fluid to be diverted through tap line 20*a* into bleed-off line 21. Once the circumstances causing the unwanted increase in pressure have been addressed, plug valve 24*a* may be shut and plug valve 24*b* opened. That will take valve 30*a* offline, and bring valve 30*b* online. Valve 30*a* then may be rebuilt and, if necessary, returned to service.

It will be appreciated that rupture discs suitable for use in the novel valves are readily available in a wide range of pressure ratings and other specifications. They have been used widely in conventional burst valves to release potentially damaging fluid from flow lines. Nevertheless, the novel pressure relief valves offer significant advantages over conventional burst valves and applications of prior art rupture discs.

That is, rupture discs are manufactured to specified design ranges (MDRs). If a disc is manufactured with a 10% MDR, for example, the disc may burst at pressures as low as 90% of the rated pressure. That range of actual burst pressures may not be desirable for many applications. That deficiency may be compounded by the fact that operating pressures may already be targeted for well below rated pressures to allow for transitory pressure surges. The tradeoff, however, is cost. The lower the MIDR, the more expensive the disc will be. Discs may be manufactured with essentially zero MDR, but they are quite expensive. They typically will cost considerably more than the same disc with a 10% MIDR.

In fracturing systems, the cost of needlessly interrupting a fracturing operation on the one hand, and the cost of potentially scrapping expensive flow iron on the other, invariably means that an operator generally opts for more expensive, more accurate rupture discs. Such discs will provide a very narrow range between acceptable operating pressures and burst pressures. The novel valves, however, are able to provide the same tight range and high degree of accuracy using cheaper rupture discs with higher ratings and higher MIDRs. That, in turn, will allow the system to be run safely at pressures approaching its maximum rated pressures.

For example, if a frac system is rated for 15,000 psi, a conventional burst valve using a rupture disc rated for 15,000 psi with a 10% MDR would necessitate running the fracturing operation at pressures well below 13,500 psi. Higher operating pressures would create the risk that the disc would rupture at pressures well below the rated pressure and needlessly interrupt operations. One the other hand, using a higher rated disc with the same MDR creates a risk that the disc will not rupture before rated pressures are exceeded.

The novel valves, however, may provide high accuracy with higher MDR, cheaper discs. Actuation of dart 41 is triggered in response to fluid pressure in line 14 which may be measured with great accuracy by pressure sensor 78. If the system is rated for maximum pressures of 15,000 psi, as described in the situation above, valve 30 could be provided with a relatively inexpensive, 10% MDR rupture disc 43 which is rated at 17,000 psi. Absent actuation of dart 41, "over rated" disc 43 may be counted on to remain intact at pressures up to 15,300 psi. Valve 30, therefore, will remain shut unless and until pressures approach the threshold value.

Moreover, the novel valves may be adjusted on the fly to accommodate different working or rated maximum pressures. In the example above, if a maximum working pressure of 14,000 psi were desired, controller 71 could be reprogrammed with the new threshold pressure, and control system 70 would open valve 30 at 14,000 psi. No changes in valve 30 are required. A conventional burst valve would require replacement of the burst disc with one appropriate for the new threshold pressure.

Figure 6:
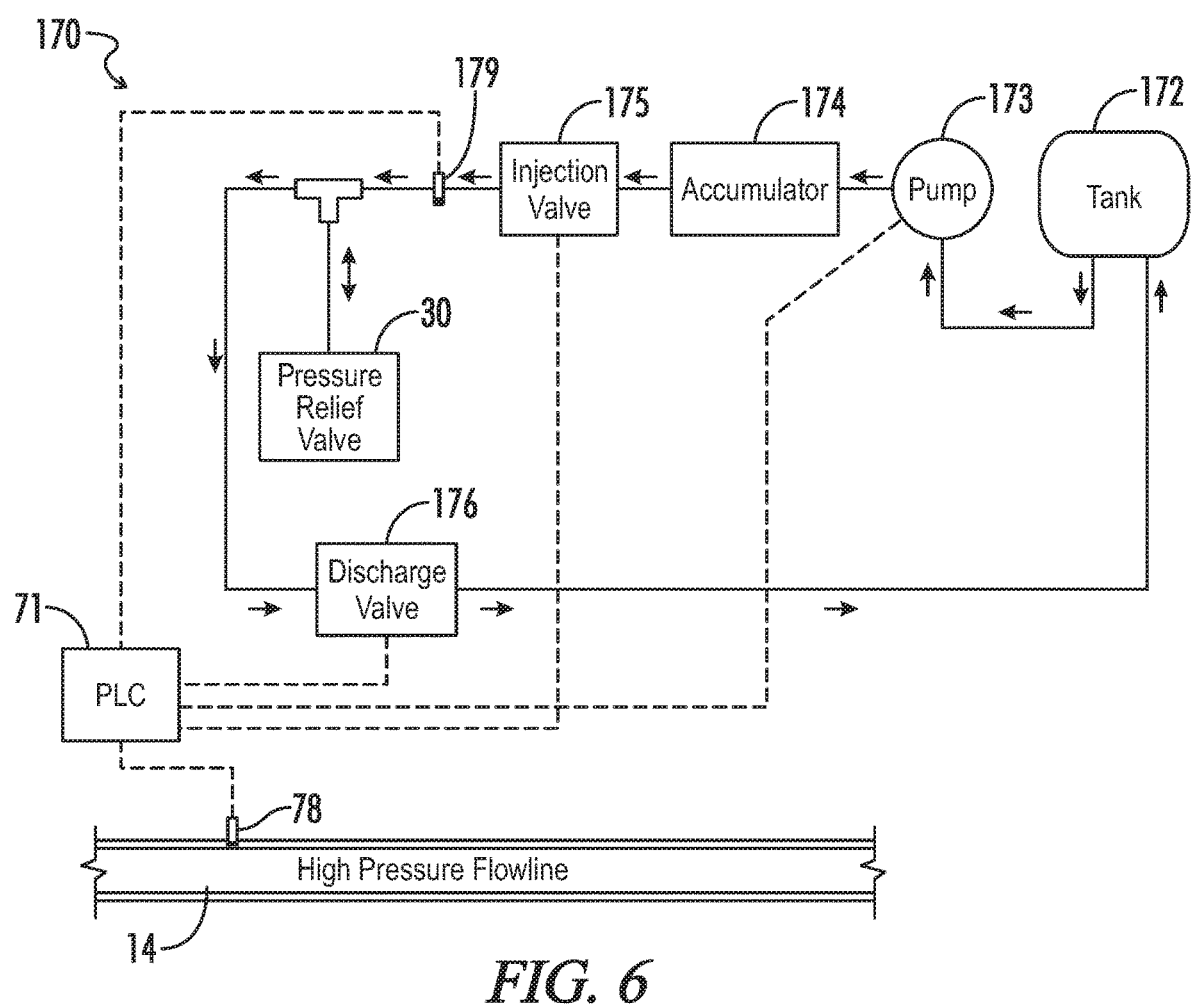
FIG. 6 is a schematic representation of a second preferred system 170 for hydraulically controlling pressure relief valve 30 and other embodiments of the novel pressure relief valves.

It will be appreciated that other systems for controlling and operating valve 30 may be used. FIG. 6, for example, shows schematically a second preferred system 170. Control system 170 is an electronically controlled hydraulic system and generally comprises controller 71, a hydraulic fluid tank 172, a hydraulic pump 173, an accumulator 174, an injection valve 175, a discharge valve 176, pressure sensor 78, and a second pressure sensor 179.

Control system 170 operates in a manner similar to system 70 except that it relies on hydraulic power instead of pneumatic power. Accumulator 174 is a conventional accumulator by which a slug of hydraulic fluid may be held under a predetermined pressure for ready discharge. Most commonly it will be a gas-charged, closed accumulator in which fluid is held under pressure by compressed gas. A spring-loaded accumulator, however, also may be suitable.

Pump 173 is used to draw fluid from tank 172 and maintain the charge on accumulator 174. Injection valve 175 and discharge valve 176 preferably are solenoid valves. They are normally shut, but are connected to and may be opened and shut by controller 71. Second pressure sensor 179, like sensor 78, is a pressure transducer or other conventional sensor for measuring fluid pressure. It is mounted in the hydraulic line running from accumulator 174 and valve 30.

When valve 30 in installed and tapped into flow line 14, signals from pressure sensor 78 will be monitored by controller 71 and compared to a predetermined pressure corresponding to the pressure rating of flow line 14 and the high-pressure side of the frac system. When pressures in excess of the predetermined pressure are detected, controller 71 will open normally shut injection valve 175 allowing hydraulic fluid to flow from accumulator 174 through connecting feed lines and into valve 30. More specifically, hydraulic fluid will be delivered through port 38 into the upper fluid chamber in valve 30. Dart 41 will be actuated and moved to its extended position, compromising disc 43 and opening valve 30.

Once valve 30 has been opened, controller 71 will shut injection valve 175 and open discharge valve 176. That may be done, for example, by detection of increased fluid pressure at sensor 179 in the line feeding valve 30. If desired, injection valve 175 may be shut and discharge valve 176 opened after a predetermined time lapse or in response to detection of a pressure drop in flow line 14 by pressure sensor 78, or by detection of fluid pressure downstream of valve 30 by an additional pressure sensor (not shown). In any event, once injection valve 175 is closed and discharge valve 176 is opened, spring 42 will cause dart 41 to return to its retracted position, forcing fluid out of valve 30 via port 38. Lines will convey fluid through discharge valve 176 back into tank 172. Discharge valve 176 then will be shut by controller 71, e.g., in response to a predetermined time lapse.

Figure 7:
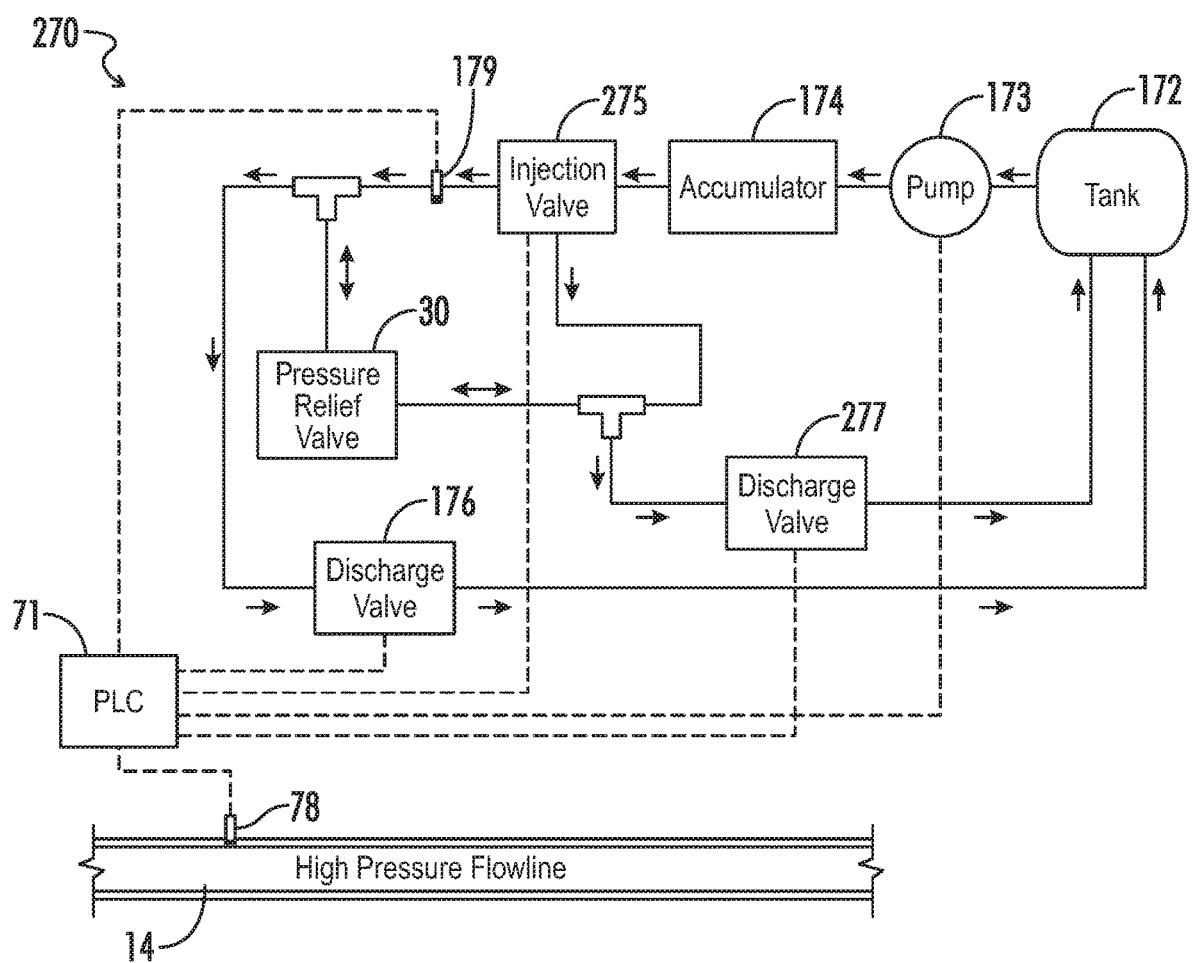
FIG. 7 is a schematic representation of a third preferred system 270 for hydraulically controlling a modified version of pressure relief valve 30 and other embodiments of the novel pressure relief valves.

A third preferred system 270 for controlling and operating the novel valves is shown schematically in FIG. 7. Control system 270 is an electronically controlled hydraulic system like control system 170. Control system generally comprises controller 71, hydraulic fluid tank 172, hydraulic pump 173, accumulator 174, an injection valve 275, discharge valve 176, a second discharge valve 277, pressure sensor 78, and pressure sensor 179.

Control system 270 operates in a manner similar to system 170 except that valve 30 will be modified to allow dart 41 to be retracted by hydraulic power. That is, return spring 42 may be eliminated and a lower discharge port (not shown) may be provided through bonnet 32 into the lower portion of the fluid chamber. Hydraulic fluid then may be introduced below the enlarged end of dart 41 to return dart 41 to its retracted position after it has been actuated.

Accordingly, injection valve 275 is a three-way valve. It is normally shut, but is connected to and may be moved from its shut position to one of two open positions. In one open position fluid will be diverted into valve 30 into the upper fluid chamber and above the piston end of dart 41. In the other open position fluid will be diverted into the lower fluid chamber and below the piston end of dart 41. Second discharge valve 277, like discharge valve 176, preferably is a solenoid valve. Discharge valve 277 is normally shut, but is connected to and may be opened and shut by controller 71.

More specifically, when excessive pressures are detected in flow line 14 by sensor 78, controller 71 will open injection valve 275 to its first open position and will open second discharge valve 277. Fluid then will flow from accumulator 174 through connecting feed lines and into valve 30 above dart 41. As dart 41 moves down, fluid will be forced out the lower discharge port, through fluid lines and second discharge valve 277 back into tank 172. Dart 41 eventually will cause disc 43 to rupture, and valve 30 will be opened.

Once valve 30 has been opened, controller 71 will open injection valve 275 to its second open position, close second discharge valve 277, and open discharge valve 176. Fluid then will flow from accumulator 174 through connecting feed lines into valve 30 below dart 41. As dart 41 moves upward back towards its original, retracted position, fluid will be forced out port 38, through fluid lines and discharge valve 176 back into tank 172. Injection valve 275 and discharge valve 176 then will be shut by controller 71, e.g., in response to a predetermined time lapse.

Figure 8:
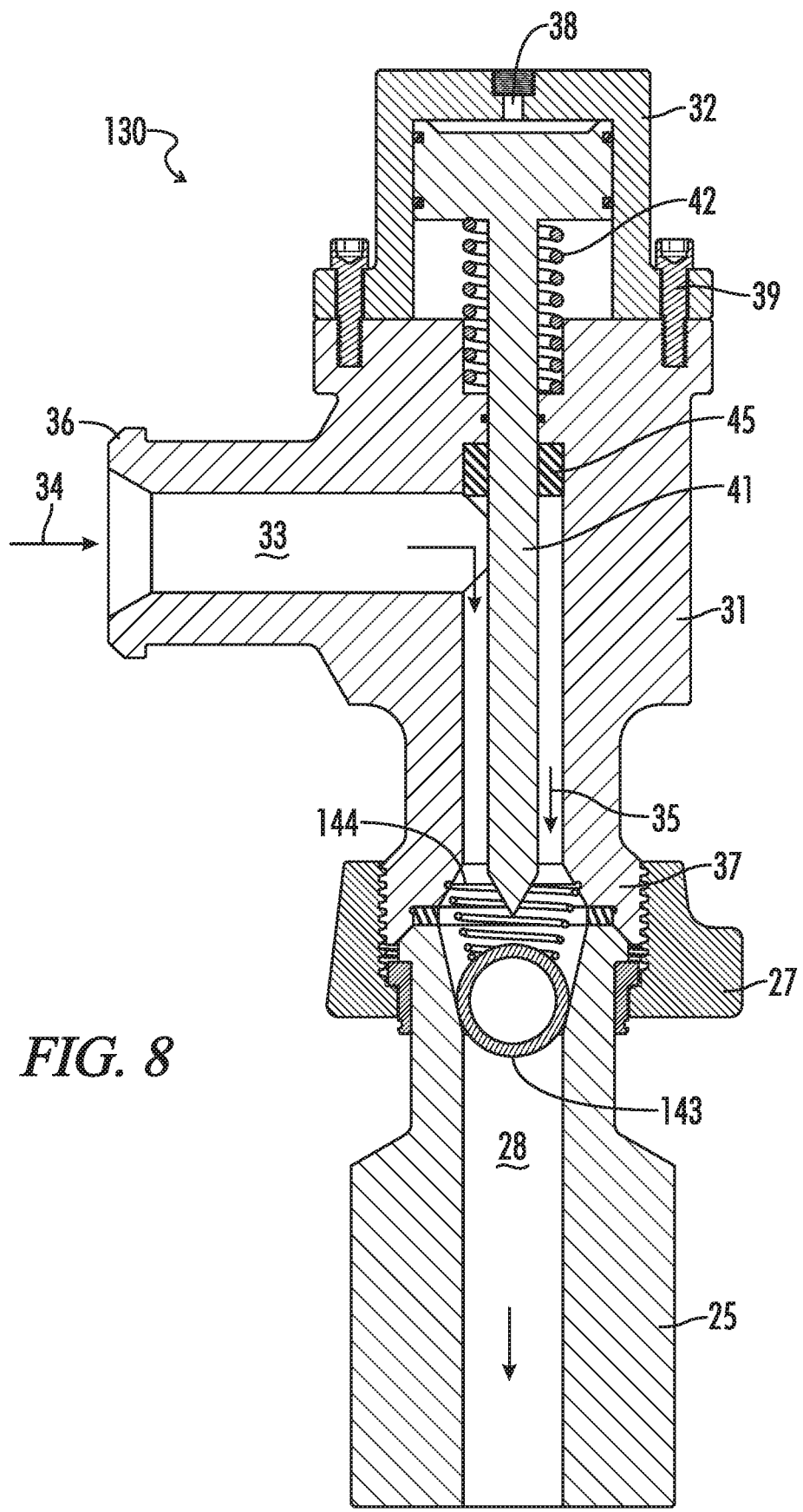
FIG. 8 is a cross-sectional view of a second preferred embodiment 130 of the pressure relief valves of the subject invention, which pressure relief valve 130 incorporates a frangible ball 143.
Figure 9:
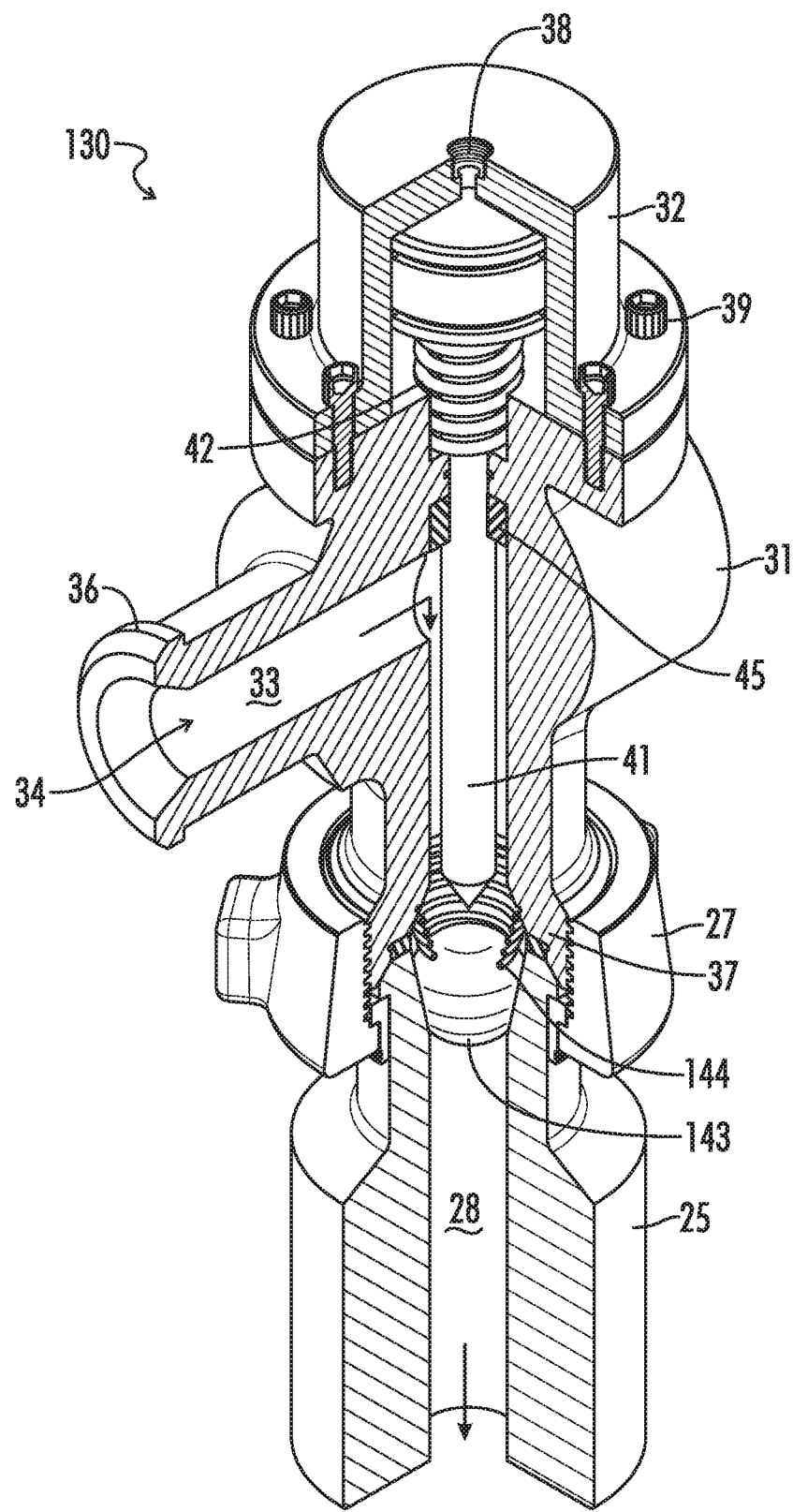
FIG. 9 is an isometric, partial quarter-sectional view of pressure relief valve 130 shown in FIG. 8.

A second preferred pressure relief valve 130 is illustrated in FIGS. 8-9 which show valve 130 in its normally closed state. Valve 130 is substantially similar to valve 30 except that instead of rupture disc 43, valve 130 incorporates a frangible closure, such as frangible ball 143. Thus, valve 130 generally comprises valve body 31, bonnet 32, dart 41, return spring 42, frangible ball 143, and a retaining spring 144.

Like rupture disc 43, frangible ball 143 provides a sacrificial closure which blocks flow beyond passage 33 when valve 130 is in its normally closed state. Frangible ball 143 is carried more or less within passage 33 at the union between female sub 37 of valve 30 and a male hammer union sub 27 of adaptor 25. When valve 130 is tapped into flow line 14 fluid pressure will cause frangible ball 143 to seat and seal against the tapered, inlet portion of passage 28 in adaptor 25, Retaining spring 144 or another suitable retainer preferably is provided to ensure that frangible ball 143 remains properly seated until valve 130 is tapped into flow line 14. An annular elastomeric seal or seat (not shown) also may be provided in the inlet of adaptor 25 to enhance the seal around frangible ball 143. Frangible ball 143, however, may be mounted elsewhere and by other means so long as it effectively blocks fluid flow beyond passage 33.

Frangible ball 143 preferably is fabricated glass or a non-porous ceramic, such as silicon nitride ($Si_3N_4$), zirconia ($ZrO_2$), alumina ($Al_2O_3$), and silicon carbide ($SiC$). Sintered powdered metals with or without adhesive or polymer binder also may be used. Suitable materials will tend to fracture or shatter upon impact by dart 41. Although illustrated as utilizing frangible ball 143, valve 130 may be provided with other frangible, sacrificial closures. Such materials may be used to form discs, including flat, concave, or convex discs or plugs of various configurations.

Valve 130 is normally closed and will be opened in the same fashion as valve 30. Dart 41 will be actuated pneumatically or hydraulically, for example, by control systems 70 or 170 in response to the detection of excess pressure in flow line 14 by pressure sensor 78. As it moves from its retracted to its extended position, dart 41 will engage and fracture frangible ball 143. Once the structural integrity of frangible ball 143 has been compromised, valve 130 will allow fluid from flow line 14 to bleed off through tap line 20 into bleed-off line 21. Return spring 42 then will urge dart 41 to return to its retracted position.

It will be appreciated that, like the specifications for rupture disc 43 in valve 30, valve 130 may provide a very narrow range between acceptable operating pressures and burst pressures while using cheaper frangible balls and other closures with higher pressure ratings and higher MDRs. High MDR closures may be used, and provided they have a sufficiently high pressure rating, valve 130 will only be opened in response to detection of excessive pressure in flow line 14.

Figure 10:
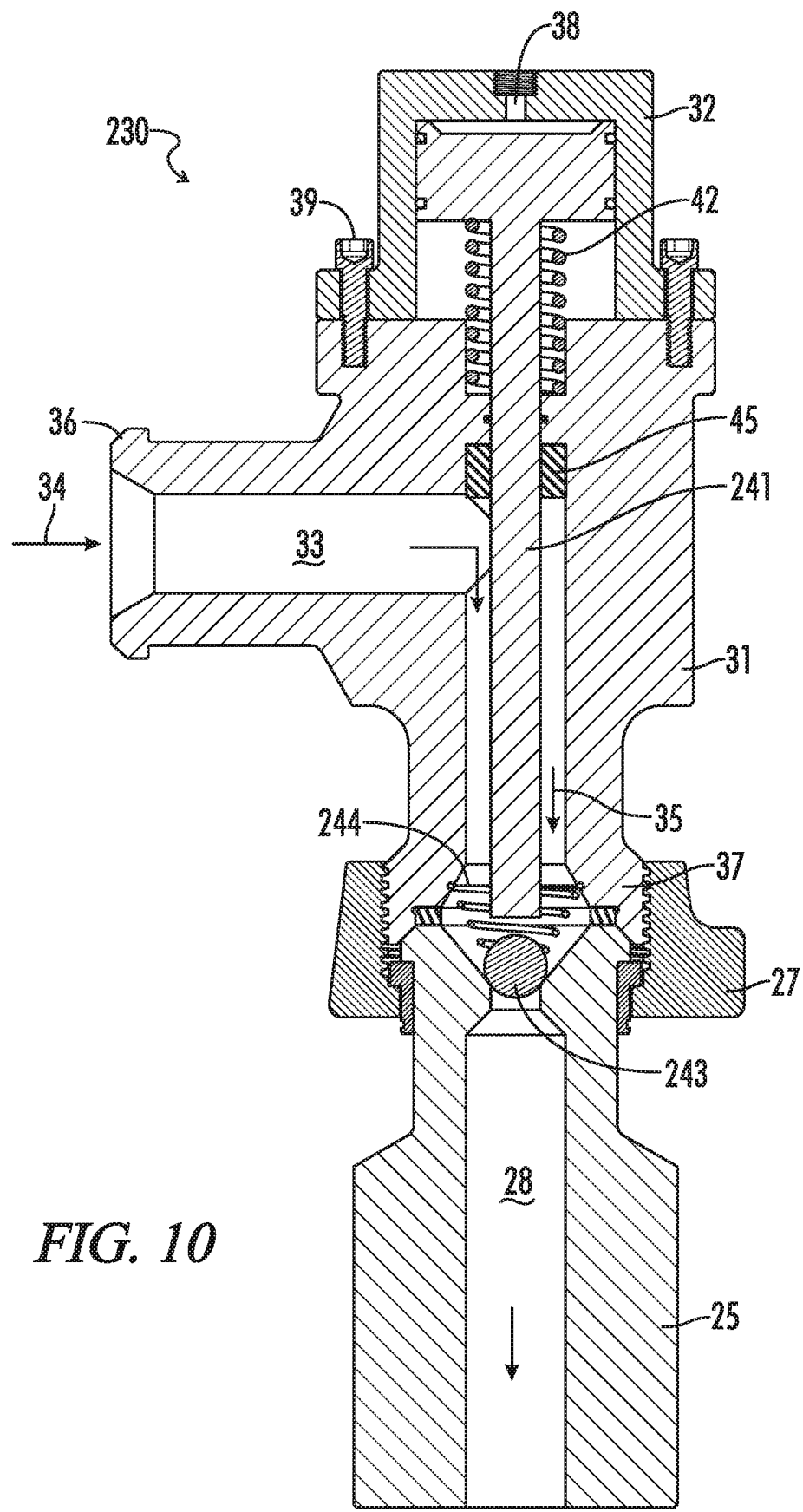
FIG. 10 is a cross-sectional view of a third preferred embodiment 230 of the pressure relief valves of the subject invention, which pressure relief valve 230 incorporates an extrudable elastomeric plug 243.
Figure 11:
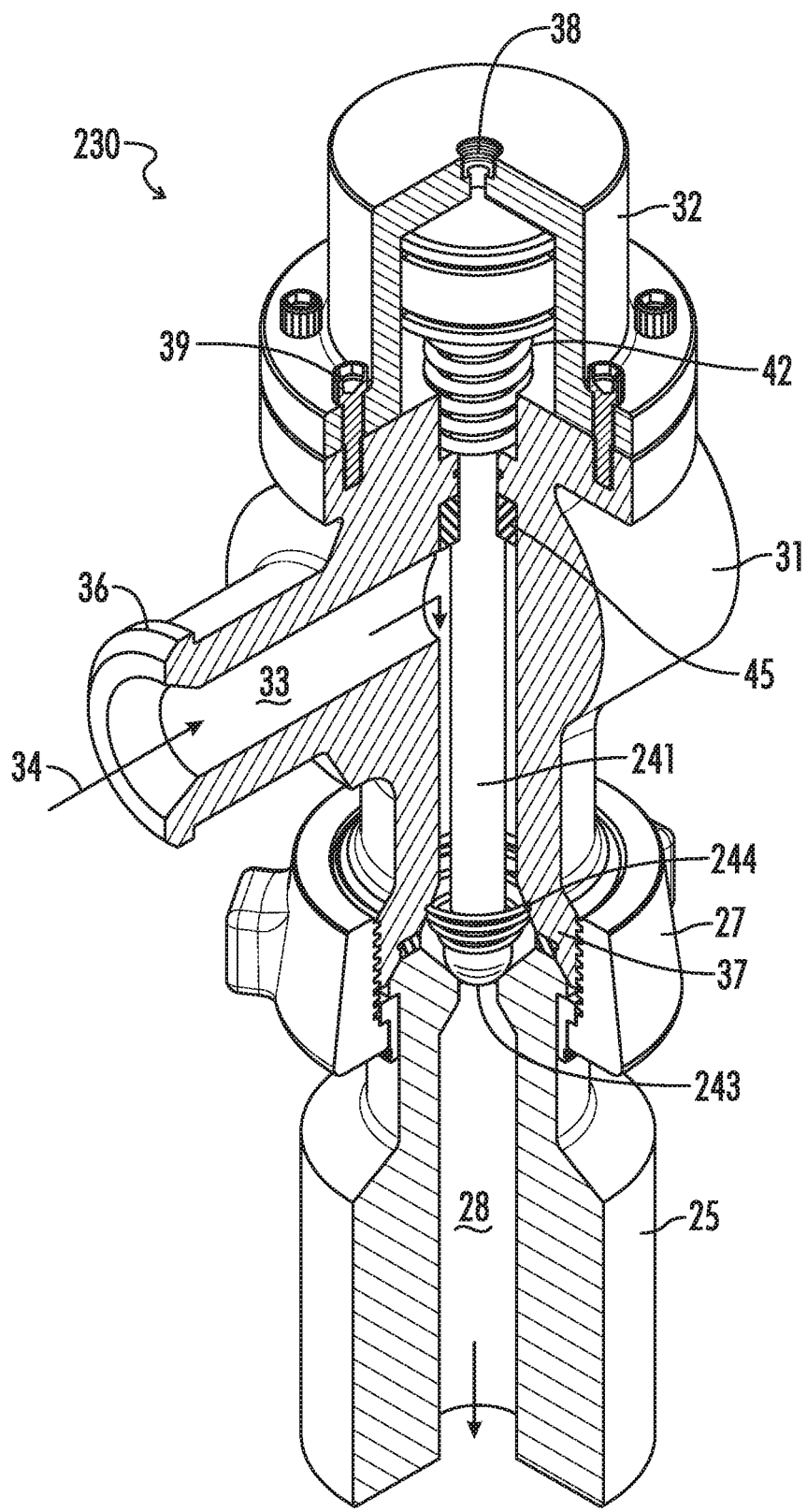
FIG. 11 is an isometric, partial quarter-sectional view of pressure relief valve 230 shown in FIG. 10.

A third preferred pressure relief valve 230 is illustrated in FIGS. 10-11 which show valve 230 in its normally closed state. Valve 230 is substantially similar to valves 30 and 130 except that dart 41 is configured as a ram 241 and it incorporates a displaceable closure, such as an elastomer plug 243. Thus, valve 230 generally comprises valve body 31, bonnet 32, ram 241, return spring 42, elastomer plug 243, and a retaining spring 244.

Like rupture disc 43 and frangible ball 143, elastomer plug 243 provides a sacrificial closure which blocks flow beyond passage 33 when valve 230 is in its normally closed state. Elastomer plug 243 is carried more or less within passage 33 at the union between female sub 37 of valve 30 and a male hammer union sub 27 of adaptor 25. When valve 230 is tapped into flow line 14 fluid pressure will cause elastomer plug 243 to seat and seal against the tapered, inlet portion of passage 28 in adaptor 25. Retaining spring 244 or another suitable retainer preferably is provided to ensure that elastomer plug 243 remains properly seated until valve 230 is tapped into flow line 14. Elastomer plug 243, however, may be mounted elsewhere and by other means so long as it effectively blocks fluid flow beyond passage 33.

Elastomer plug 243 preferably is fabricated from elastomers, such as nitrile butadiene rubber (NBR), hydrogenated nitrile butadiene nitrile rubber (HNBR), and fluoroelastomers such as Viton® as are commonly employed in flow iron components. Though illustrated as being spherical, elastomer plug 243 may have other shapes suitable for other seat configurations. Suitable elastomer plugs will be extrudable through the seat. Other displaceable plugs, however, may be used. For example, a plug having a rigid core with an elastomer skin also may be configured for seating within a passage and for displacement by a ram. Likewise, a rigid plug may be releasably adhered or bonded to a passage, and then displaced by a ram.

Valve 230 is normally closed and will be opened in the same fashion as valves 30 and 130. Ram 241 will be actuated pneumatically or hydraulically, for example, by control systems 70 or 170 in response to the detection of excess pressure in flow line 14 by pressure sensor 78. As it moves from its retracted to its extended position, ram 241 will engage and push or extrude elastomer plug 243 through its seat. Once elastomer plug 243 has been deformed and its closure compromised, valve 230 will allow fluid from flow line 14 to bleed off through tap line 20 into bleed-off line 21. Return spring 42 then will urge ram 241 to return to its retracted position.

It will be appreciated that like rupture disc 43 and frangible closure 143, elastomer plug 243 may be designed to extrude through the inlet of passage 28 in adaptor 25 at a given pressure. Other displaceable closures also may be designed to release at a given pressure. Manufacturing elastomer plug 243 and other displaceable closures with tighter and tighter MDRs, however, also will be progressively more expensive. Nevertheless, valve 330 may provide a very narrow range between acceptable operating pressures and opening pressures while using cheaper displaceable closures with higher MDRs. Provided they have a sufficiently high extrusion or displacement rating, closures with relatively high MDRs may be used, but valve 330 still will only be opened in response to detection of excessive pressure in flow line 14.

Figure 12:
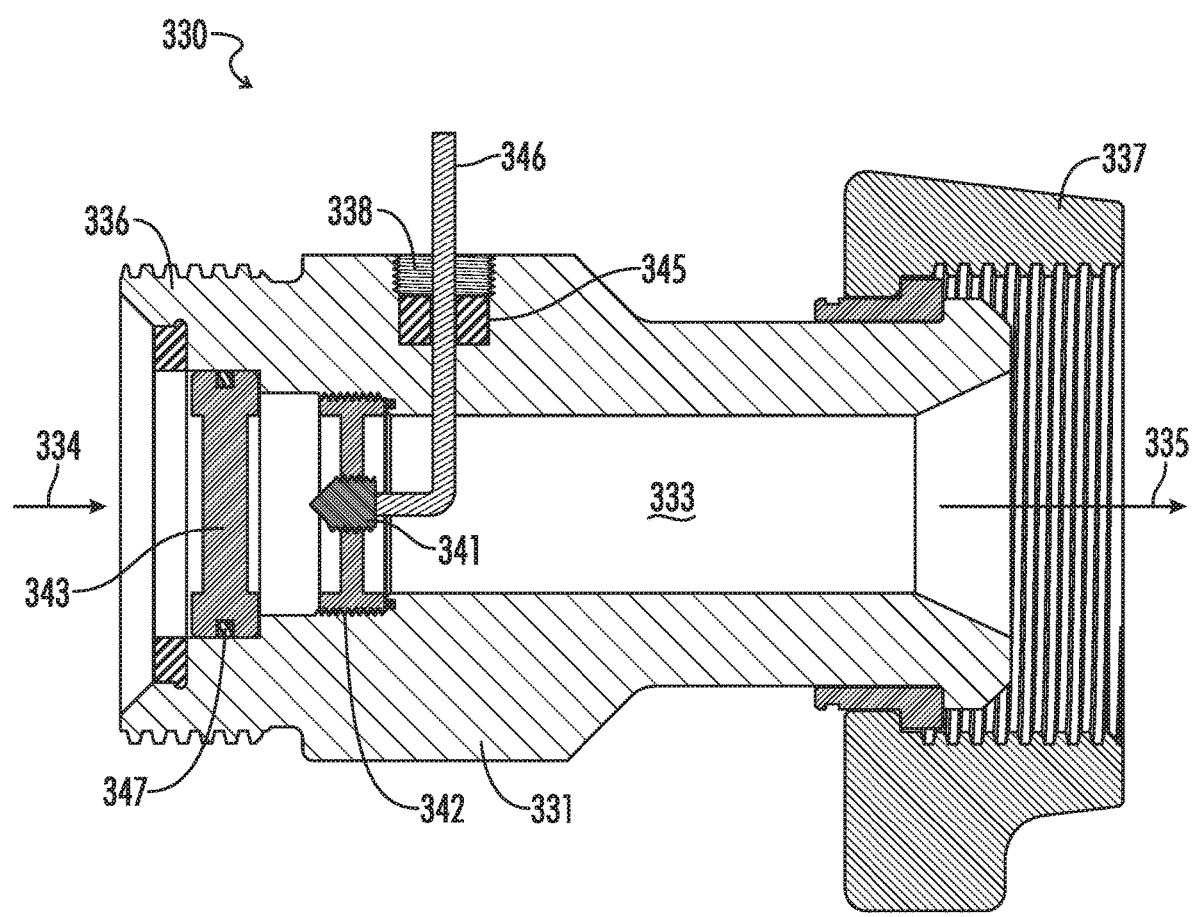
FIG. 12 is a cross-sectional view of a fourth preferred embodiment 330 of the pressure relief valves of the subject invention, which pressure relief valve 330 incorporates a penetrable closure 343.
Figure 13:
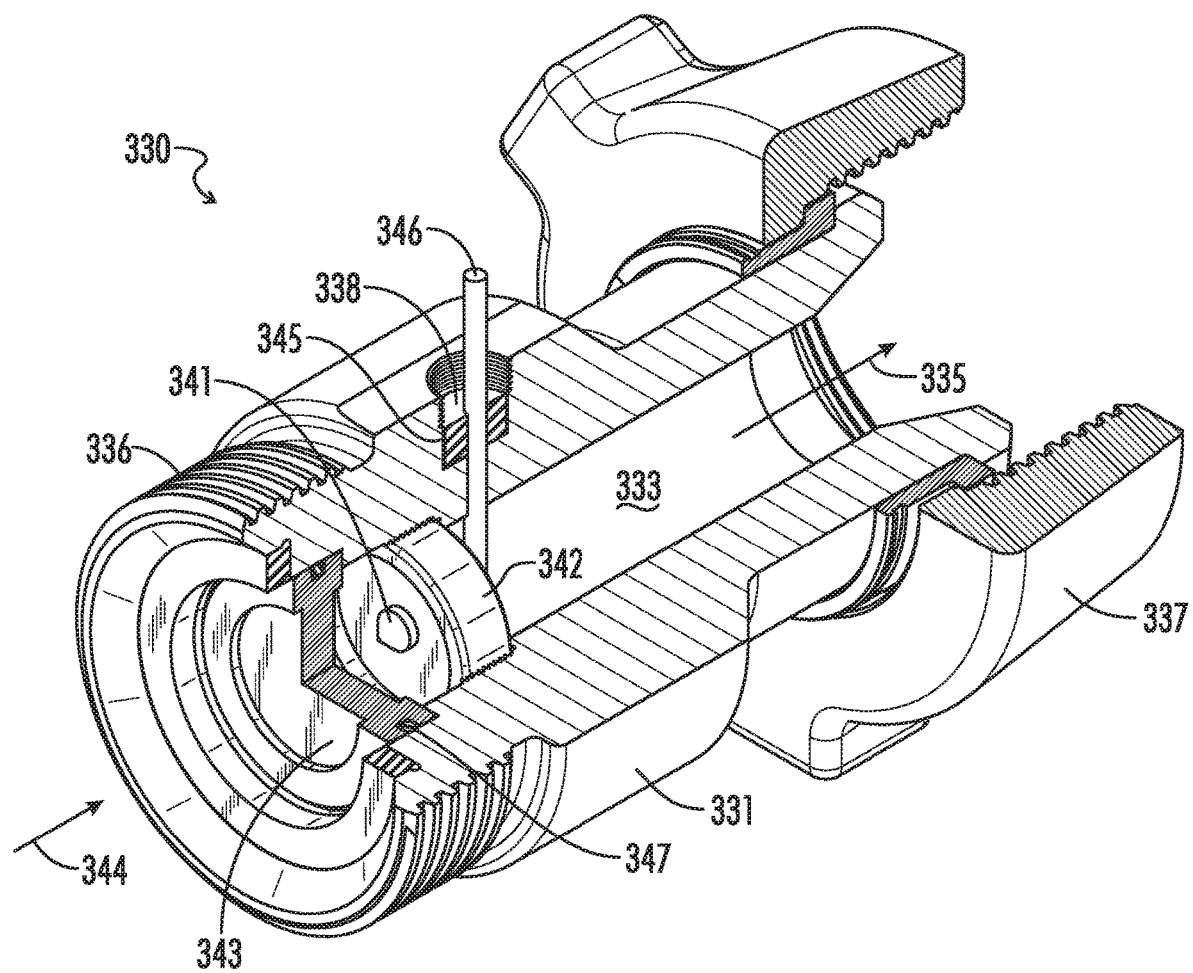
FIG. 13 is an isometric, partial quarter-sectional view of pressure relief valve 330 shown FIG. 12.

A fourth preferred pressure relief valve 330 is shown in FIGS. 12-13 which show valve 330 in its normally closed state. As shown therein, valve 330 generally comprises a valve body 331. Valve body 331 provides a housing for various internal components of valve 330, namely, a shaped charge 341, a charge mount 342, and a penetrable closure such as penetrable disc 343.

As its name implies, body 3M comprises the major portion of valve 330 and defines many of its primary features. In particular, body 331 is provided with a generally cylindrical, straight passage 333 extending between a valve inlet 334 and a valve outlet 335. Passage 333, when valve 330 is opened as described further below, provides a conduit for fluids conveyed by tap line 20 to reduce pressure in flow line 14. Inlet 334 is provided with a female hammer union sub 336. Female sub 336 facilitates assembly of valve 330 into tap line 20, e.g., by joining inlet 334 of valve 330 to the outlet of plug valve 24. Outlet 335 is provided with a male hammer union sub 337 which facilitates assembly of valve 330 into tap line 20, e.g., by joining outlet 335 of valve 330 to the inlet of adaptor 25. (Plug valve 24 and adaptor 25 necessarily would be modified in this embodiment to provide mating union subs.)

Penetrable disc 343 provides a sacrificial closure which blocks flow through passage 333 when valve 330 is in its normally closed state. More specifically, as may be seen in FIGS. 12-13, disc 343 is carried within inlet 334 of passage 333. Elastomeric O-ring 347 may be provided around the periphery of disc 343, or other sealing members may be provided to enhance the seal between disc 343 and passage 333. When valve 330 is tapped into flow line 14 fluid pressure will cause disc 343 to seat against a shoulder provided in passage 333. Preferably, however, O-ring 347 is sized to ensure that disc 343 fits snugly within passage 333 and is held therein until valve 330 is tapped into flow line 14. It will be appreciated, however, that penetrable disc 343 may be mounted elsewhere and in a variety of ways such that it blocks fluid flow through passage 333.

Shaped charge 341 comprises high explosives which, when ignited, are adapted to generate a jet of gas, typically entrained with tiny metal particles, with extremely high kinetic energy. It is mounted within valve 330 such that the explosive jet is directed toward penetrable closure 343. For example, as shown in FIGS. 12-13, charge 341 is carried in mount 342. Mount 342 is a disc-shaped mount which is carried in passage 333, e.g., by a threaded connection therebetween. An electrical lead 346 is connected to charge 341 to allow ignition of charge 341. Electrical lead 346 is fed through an opening 338 provided in body 331 and may be secured, e.g., by a fitting (not shown) threaded into an enlarged portion of opening 338. A packing 345 preferably is provided around lead 346, e.g., in the enlarged portion of opening 338. It will be appreciated, however, that any suitable means for mounting shaped charge 341 may be employed.

A variety of shaped charges capable of generating different levels of penetrating force are available commercially and may be suitable for use valves 330. Typically, such charges comprise a cylindrical metal housing enclosing a charge of relatively insensitive, secondary high explosive material. Common secondary high explosive materials include 1,3,5-trinitro-1,3,5-triazine (RDX), octahydro-1,3,5, 7-tetranitro-1,3,5,7-tetrazocine (HMX), 2,6-bis(picrylamino)-3,5-dinitropyridine (PYX), 1,3,5-trinitro-2-[2-(2,4, 6-trinitrophenyl)ethenyl]benzene (HNS), and other nitramides. The high explosives are shaped into a solid cylinder, one end of which provides a cylindrically shaped charge cavity. A thin, metallic conical liner is provided in the conical charge cavity, and a relative sensitive, primary explosive material is carried within an axial opening in the main charge. The primary explosive material may be ignited, e.g., by heat generated through electrical resistance, and it in turn will ignite the main charge.

In any event, when valve 330 in its normally closed state as shown in FIGS. 12-13, penetrable disc 343 is exposed to fluid pressure in flow line 14 via tap line 20, but it shuts off flow through valve 330. Valve 330, in the event that excess pressure is detected in flow line 14, may be opened by detonating shaped charge 341. Charge 341 will direct a high kinetic energy jet toward disc 343, penetrating it or otherwise compromising its integrity and allowing fluid to flow through valve 330.

Charge 341 may be detonated and valve 330 opened by control systems similar to those used to actuate valves 30, 130, and 230. A pressure transducer or other conventional sensor for measuring fluid pressure may be mounted in flow line 14 and connected to a programmable logic controller or other programmable digital computer. Signals from the pressure sensor will be monitored by controller and compared to a predetermined pressure corresponding to the pressure rating of flow line 14. When pressures in excess of the predetermined pressure are detected, the controller will power lead 346 to ignite charge 341.

Penetrable disc 343 preferably is a rupturable or frangible closure like rupture disc 43 and frangible closure 143. Displaceable closures, such as elastomeric plug 243 also may be suitable. Given the kinetic energy which shaped charges are capable of generating, it is expected that a wider range of closures may be used with even higher nominal rupture or fracture ratings, and with even higher manufacturing tolerances.

Figure 14:
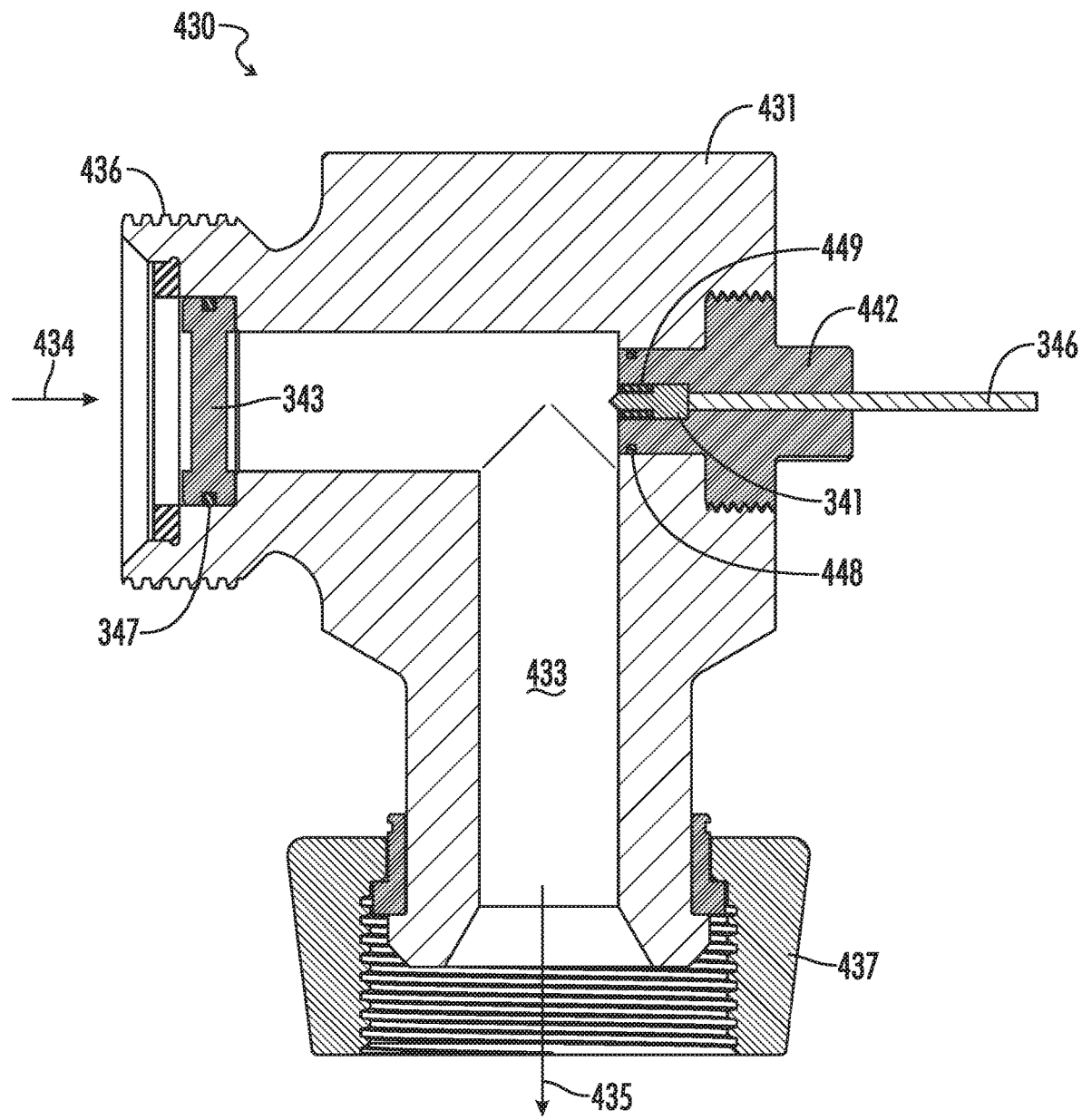
FIG. 14 is a cross-sectional view of a fifth preferred embodiment 430 of the pressure relief valves of the subject invention, which pressure relief valve 430 incorporates penetrable closure 343.
Figure 15:
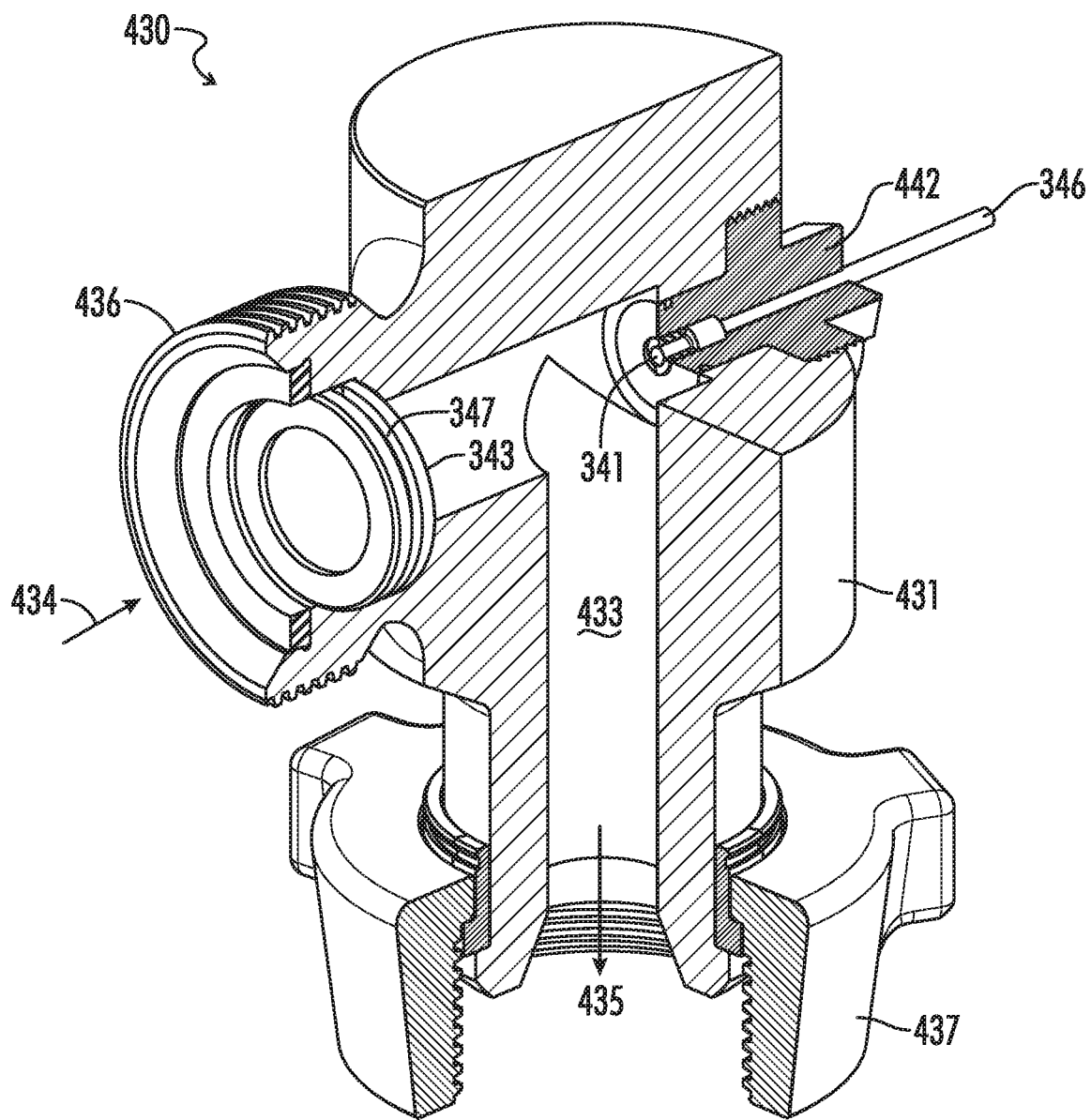
FIG. 15 is an isometric, partial quarter-sectional view of pressure relief valve 430 shown in FIG. 14.

A fifth preferred pressure relief valve 430 is shown in FIGS. 14-15 which show valve 430 in its normally closed state. Valve 430 incorporates shaped charge 341 and is quite similar to valve 330 except that valve 430 is an "elbow" valve and shaped charge 341 is carried on mount 442. Thus, valve 430 generally comprises a valve body 431, shaped charge 341, charge mount 442, and penetrable disc 343.

As may be seen in FIGS. 14-15, body 431 of valve 430 defines a generally, cylindrical, L-shaped passage 433 extending between valve inlet 434 and valve outlet 435. Charge mount 442 is essentially an insert which fits into a counter-sunk bore provided in body 431. Mount 442 comprises an opening through which electrical lead 346 passes. Shaped charge 341 may be secured in an enlarged portion of the opening in mount 442, e.g., by threaded connections. Elastomeric O-ring 448 or other sealing elements preferably are provided around mount 442, as is packing 449 around charge 341. Mount 442 preferably is removably assembled to body 431, e.g., by a threaded connection between mount 442 and the counter-sunk bore in body 431.

Charge 341 may be detonated and valve 430 opened like valve 330 described above. Like valve 330, valve 430 may provide a very narrow range between acceptable operating pressures and opening pressures while using cheaper sacrificial closures with higher MDRs.

Figure 16:
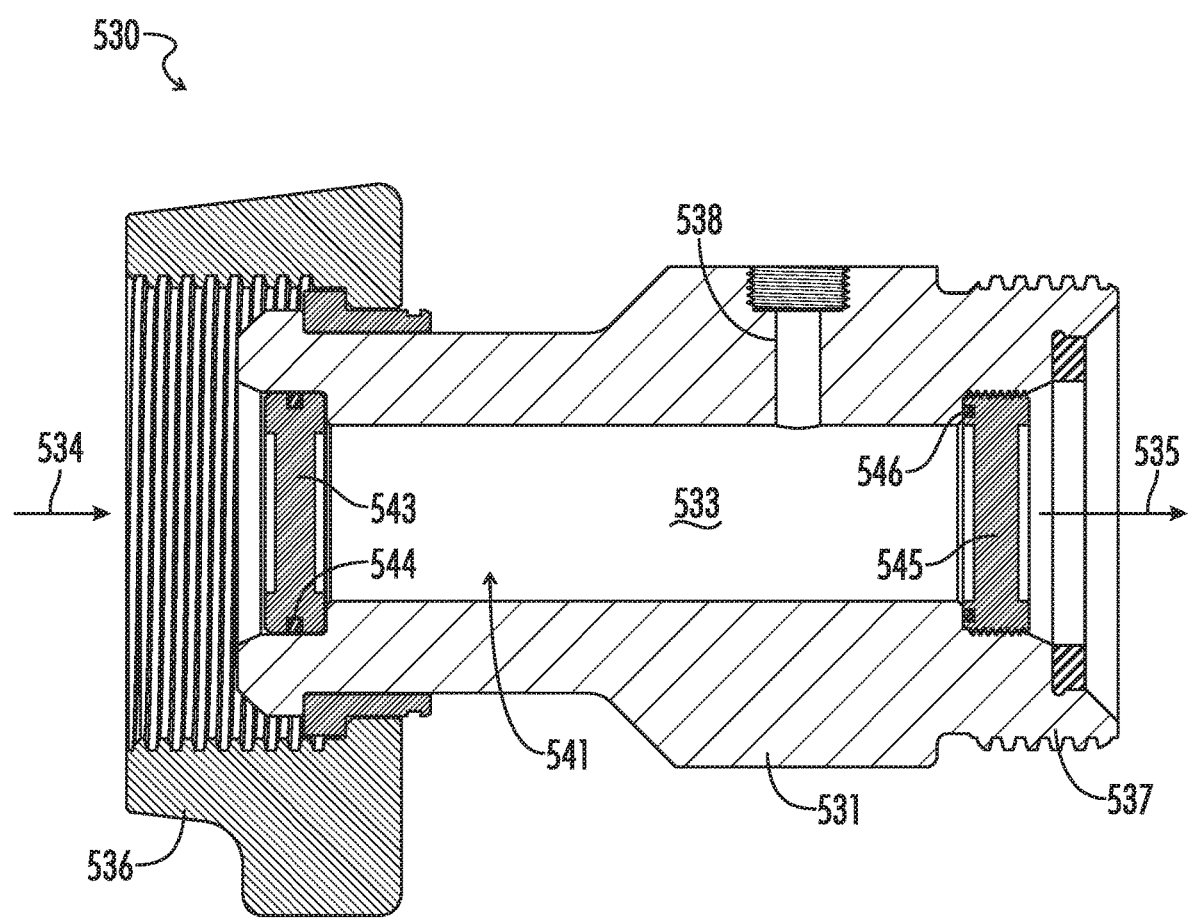
FIG. 16 is a cross-sectional view of a sixth preferred embodiment 530 of the pressure relief valves of the subjection invention, which pressure relief valve 530 incorporates a primary rupture disc 543 and a secondary rupture disc 545.
Figure 17:
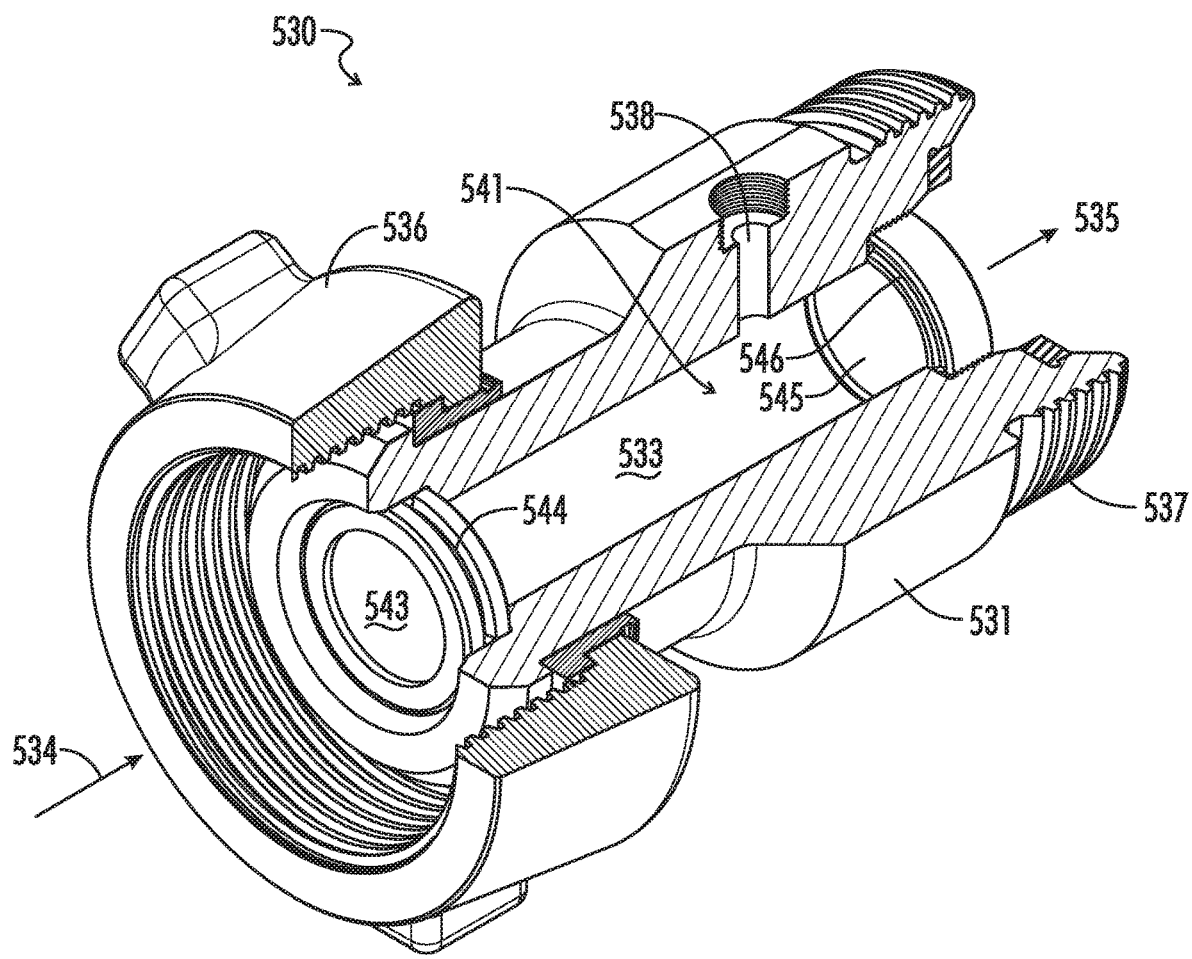
FIG. 17 is an isometric, partial quarter-sectional view of pressure relief valve 530 shown in FIG. 16.

A sixth preferred pressure relief valve 530 is shown in FIGS. 16-17 which show valve 530 in its normally closed state. As shown therein, valve 530 generally comprises a valve body 531. Valve body 531 provides a housing for various internal components of valve 530, namely, a primary sacrificial closure, such as primary rupture disc 543, and a secondary sacrificial closure, such as secondary rupture disc 545.

As its name implies, body 531 comprises the major portion of valve 530 and defines many of its primary features. In particular, body 531 is provided with a generally cylindrical, straight passage 533 extending between a valve inlet 534 and a valve outlet 535. Passage 533, when valve 530 is opened as described further below, provides a conduit for fluids conveyed by tap line 20 to reduce pressure in flow line 14. Inlet 534 and outlet 535 are provided, respectively, with a male hammer union sub 536 and a female hammer union sub 537 by which valve 530 may be assembled into tap line 20.

Primary rupture disc 543 provides a sacrificial closure which blocks flow through passage 533 when valve 530 is in its normally closed state. More specifically, as may be seen in FIGS. 16-17, primary disc 543 is carried within inlet 534 of passage 533. An elastomeric O-ring 544 may be provided around the periphery of primary disc 523, or other sealing members may be provided to enhance the seal between primary disc 543 and passage 533. When valve 530 is tapped into flow line 14 fluid pressure will cause disc 543 to seat against a shoulder provided in passage 533. Preferably, however, O-ring 544 is sized to ensure that disc 543 fits snugly within passage 533 and is held therein until valve 530 is tapped into flow line 14.

Primary rupture disc 543 and secondary rupture disc 545, as described further below, provide a chamber 541 which may be pressurized to backup primary rupture disc 543. Secondary disc 545 is mounted within outlet 535 of passage 533, e.g., by threaded connections therebetween. An elastomeric O-ring 546 or other sealing member may be provided to enhance the seal between secondary disc 545 and passage 533. When valve 530 is tapped into flow line 14 secondary disc 545 will not be exposed to fluid in flow line 14, primary disc 543 being interposed upstream therefrom.

A port 538 is provided in body 531. Port 538 allows fluid to flow into and out of chamber 541. A fluid feed line (not shown) will be connected to port 538, e.g., by a threaded fitting which may be screwed into port 538. Pressurized fluid may be introduced into chamber 541 through port 538 to provide pressure behind primary disc 543, and then released to induce rupturing of both primary disc 543 and secondary disc 545.

That is, primary disc 543 will have a burst pressure lower than the pressure rating of flow line 14 and the high-pressure side of the frac system. Secondary disc 545 also will have a burst pressure less than the pressure rating of flow line 14, and preferably less than that of primary disc 543. Before valve 530 is brought online, e.g., by opening its corresponding plug valve 24, fluid will be introduced into chamber 541 and pressurized to a pressure below the burst pressure of primary disc 543 and secondary disc 545. The pressure ratings of primary disc 543 and secondary disc 545, and the pressure within chamber 541 will be coordinated such that when valve 530 is brought online, the pressure differential across primary disc 543 is well below the pressure rating of flow line 14.

For example, if flow line 14 is rated for pressures up to 15,000 psi, primary disc 543 may be selected such that it has a burst pressure of 12,000 psi. Secondary disc 545 may be selected to have a burst pressure of 10,000 psi, and chamber 541 may be charged to a pressure of 8,000 psi. The differential pressure across primary disc 543 as pressures approach the rating of flow line 14 (15,000 psi) is only 7,000 psi. Primary disc 543, therefore, would not burst of its own accord until pressures approaches 20,000 psi.

Valve 530, however, may be actuated to release the pressurized fluid in chamber 541 at the rated pressure of flow line 14 (15,000 psi). As pressure is released from chamber 541 the differential pressure across primary disc 543 rapidly approaches and exceeds its burst pressure of 12,000 psi. Primary disc 543 will burst, as will secondary disc 545 given that its burst strength also is well below the rated pressure of 15,000 psi.

Fluid may be injected into and released from chamber 541, and valve 530 opened by control systems like those used to actuate valves 30, 130, and 230. The control system will incorporate a source of pressurized gas or hydraulic fluid. A programmable logic controller or other programmable digital computer may be used to control pumps and valves as needed to charge chamber 541 before valve 530 is brought online. A pressure transducer or other conventional sensor for measuring fluid pressure may be mounted in flow line 14. Signals from the pressure sensor will be monitored by the controller and compared to a predetermined pressure corresponding to the pressure rating of flow line 14. When pressures in excess of the predetermined pressure are detected, the controller will actuate appropriate valves to release pressure from chamber 541 and to initiate wowing of primary disc 543 and secondary disc 545.

In addition to rupture discs as used, e.g., in valve 30, the primary and secondary closures may be frangible closures as used, e.g., in valve 130. Displaceable closures, such as elastomeric plug 243 also may be suitable. It will be appreciated that the various burst ratings and pressures may be coordinated to allow for closures with relatively large MDRs and avoid the need for more expensive, more accurate closures. Nevertheless, since the valve is actuated in response to highly accurate pressure signals, the novel valves provide a very narrow range between acceptable operating pressures and opening pressures.

In general, the various components of the novel unions may be fabricated by methods and from materials commonly used in manufacturing flowline components. Given the extreme stress and the corrosive and abrasive fluids to which flowline components are exposed, especially those designed for high-pressure flow lines, suitable materials will be hard and strong. For example, excepting their seals, the components of novel pressure relieve valves may be fabricated from 4130 and 4140 chromoly steel or from somewhat harder, stronger steel such as 4130M7, high end nickel alloys, and stainless steel. The components may be made by any number of conventional techniques, but typically and in large part will be made by forging, extruding, or mold casting a blank part and then machining the required features into the part.

The novel valves also have been illustrated as assembled from various components. For example, valve 30 is provided with bonnet 32, inter alia, to facilitate assembly and rebuilding of valve 30. Bonnet 32 may be eliminated, however, and valve body 31 may be configured to provide a pneumatic or hydraulic chamber. The features of the novel valves may be provided by more or fewer components than illustrated.

The novel valves also will incorporate various features of conventional valves and connections. For example, the exemplified valves have been described as incorporating various seals, seats, and packing elements, and having specific unions. Other conventional features, however, may be incorporated into the novel valves as will be readily appreciated by workers in the art having the benefit of this disclosure.

Similarly, the novel valves have been described in the context of frac systems. While frac systems in particular and the oil and gas industry in general rely on pressure relieve valves, especially in high-pressure applications, the novel valves are not limited to such applications or industries. Likewise, they are not limited in their application to the specific, exemplified tap lines or to the exemplified pressure ratings, nor to the exemplified control systems. Suffice it to say that the novel pressure relief valves have wide applicability wherever pressure relief valves have been conventionally applied.

It also will be appreciated that the terms such as "upper," "lower," "forward," "rearward," are made primarily with reference to the orientation in which the novel valves are illustrated in the figures. The novel valves may be installed with any desired orientation.

While this invention has been disclosed and discussed primarily in terms of specific embodiments thereof, it is not intended to be limited thereto. Other modifications and embodiments will be apparent to the worker in the art.

What is claimed is:

1. A pressure relief valve adapted for installation in a system conveying frac fluid into a well under high pressure and flow rates, said pressure relief valve being normally shut and adapted to open at a threshold fluid pressure in said frac system, said pressure relief valve comprising, when said valve is installed in said frac system:
   (a) a body connected to said frac system;
   (b) a passage defined in said body providing a valve inlet and a valve outlet, wherein said inlet is in fluid communication with frac fluid flowing through said frac system;
   (c) a sacrificial closure blocking flow of frac fluids through said passage, said closure being exposed to fluid pressure in said frac system; and
   (d) means for compromising said sacrificial closure in response to detection of said threshold pressure in said frac system whereby frac fluid transported through said frac system flows through said passage and out said valve outlet.

2. A system for conveying frac fluids into a well under high pressure and flow rates, said frac system comprising first and second pressure bleed-off tap lines, wherein each said tap line is connected to said frac system and comprises a shutoff valve controlling flow through said tap line and at least one said tap line comprises a pressure relief valve of claim 1.

3. A method for controlling flow through a system for conveying frac fluids into a well under high pressure and flow rates, wherein said method comprises:
   (a) installing a pressure relief valve of claim 1 in fluid communication with said frac system; and
   (b) opening said valve when a threshold pressure is exceeded in said frac system, thereby, relieving excess pressure in said frac system.

4. A pressure relief valve adapted for installation in a system conveying frac fluid into a well under high pressure and flow rates, said pressure relief valve being normally shut and adapted to open at a threshold fluid pressure in said frac system, said pressure relief valve comprising, when said valve is installed in said frac system
   (a) a body connected to said frac system;
   (b) a passage defined in said body providing a valve inlet and a valve outlet, wherein said inlet is in fluid communication with frac fluid flowing through said frac system;
   (c) a sacrificial closure blocking flow of frac fluids through said passage, said closure being exposed to fluid pressure in said frac system; and
   (d) a linear actuator, said actuator being actuatable in response to detection of said threshold pressure in said frac systems to move from a retracted position to an extended position in which extended position said actuator engages said closure to open said passage;
   (e) whereby frac fluid transported through said frac system flows through said passage and out said valve outlet.

5. The pressure relief valve of claim 4, wherein said actuator comprises a dart and said closure is a penetrable closure, whereby upon actuation of said actuator said dart penetrates said closure.

6. The pressure relief valve of claim 5, wherein said closure comprises a metal rupture disk and said dart pierces said rupture disk.

7. The pressure relief valve of claim 5, wherein said closure comprises a frangible plug and said dart fractures said frangible plug.

8. The pressure relief valve of claim 4, wherein said closure is a displaceable closure and said actuator comprises a ram, whereby upon actuation of said actuator said ram displaces said closure from said passage.

9. The pressure relief valve of claim 8, wherein said closure is an elastomeric plug and said ram extrudes said plug.

10. The pressure relief valve of claim 4, wherein said actuator comprises a pneumatic or hydraulic cylinder.

11. The pressure relief valve of claim 10, wherein said actuator comprises a hydraulic cylinder and said valve is operably connected to an electronic actuation system comprising:
    (a) a pressure detector adapted to measure fluid pressure in said frac system;
    (b) a valve for controlling flow from a source of pressurized hydraulic fluid to said hydraulic cylinder;
    (c) a digital controller adapted to receive signals from said detector corresponding to pressure in said frac system, to compare said pressure in said frac system to said threshold fluid pressure, and to send a signal to open said control valve in response to said pressure in said frac system exceeding said threshold fluid pressure.

12. The pressure relief valve of claim 10, wherein said actuator comprises a pneumatic cylinder and said valve is operably connected to an electronic actuation system comprising:
    (a) a pressure detector adapted to measure fluid pressure in said frac system;
    (b) a valve for controlling flow from a source of pressurized gas to said pneumatic cylinder;
    (c) a digital controller adapted to receive signals from said detector corresponding to pressure in said frac system, to compare said pressure in said frac system to said threshold fluid pressure, and to send a signal to open said control valve in response to said pressure in said frac system exceeding said threshold fluid pressure.

13. A pressure relief valve adapted for installation in a system conveying frac fluid into a well under high pressure and flow rates, said pressure relief valve being normally shut and adapted to open at a threshold fluid pressure in said frac system, said pressure relief valve comprising, when said valve is installed in said frac system
- (a) a body connected to said frac system;
- (b) a passage defined in said body providing a valve inlet and a valve outlet, wherein said inlet is in fluid communication with frac fluid flowing through said frac system;
- (c) a sacrificial closure blocking flow of frac fluids through said passage, said closure being exposed to fluid pressure in said frac system;
- (d) a shaped charge, said shaped charge being actuatable in response to detection of said threshold pressure in said frac system to direct kinetic energy sufficient to compromise the integrity of said sacrificial closure to open said passage;
- (e) whereby frac fluid transported through said frac system flows through said passage and out said valve outlet.

14. The pressure relief valve of claim 13, wherein said sacrificial closure is a metal rupture disk, a frangible ball or disk, or a plug.

15. The pressure relief valve of claim 14, wherein said shaped charge, upon ignition, releases a jet of gas, with or without entrained metal particles, that directly impacts said sacrificial closure.

16. The pressure relief valve of claim 13, wherein said valve is operably connected to an electronic actuation system comprising:
- (a) a pressure detector adapted to measure fluid pressure in said frac system; and
- (b) a digital controller adapted to receive signals from said detector corresponding to pressure in said frac system, to compare said pressure in said frac system to said threshold fluid pressure, and to send a signal to ignite said shaped charge in response to said pressure in said frac system exceeding said threshold fluid pressure.

17. The pressure relief valve of claim 16, wherein said shaped charge, upon ignition, releases a jet of gas, with or without entrained metal particles, that directly impacts said sacrificial closure.

18. The pressure relief valve of claim 13, wherein said shaped charge, upon ignition, releases a jet of gas, with or without entrained metal particles, that directly impacts said sacrificial closure.

19. A pressure relief valve adapted for installation in a system conveying frac fluid into a well under high pressure and flow rates, said pressure relief valve being normally shut and adapted to open at a threshold fluid pressure in said frac system, said pressure relief valve comprising, when said valve is installed in said frac system
- (a) a body connected to said frac system;
- (b) a passage defined in said body providing a valve inlet and a valve outlet, wherein said inlet is in fluid communication with frac fluid flowing through said frac system;
- (c) a first sacrificial closure blocking flow of frac fluids through said passage, said closure being exposed to fluid pressure in said frac system and blocking flow through said passage at fluid pressures below a first rated pressure;
- (d) a second sacrificial closure blocking flow through said passage, said closure being downstream from said first closure and blocking flow through said passage at fluid pressures below a second rated pressure;
- (e) said first and second closures defining a chamber having a port allowing outflow of fluid into said chamber, said chamber having a relievable internal fluid pressure;
- (f) wherein
  - i) said first rated pressure is less than said threshold pressure;
  - ii) said second rated pressure is less than said threshold pressure;
  - iii) said chamber pressure is
    - (1) less than said first and second rated pressures; and
    - (2) greater than the difference between said threshold pressure and said first rated pressure;
- (g) whereby the pressure differential across said first sacrificial closure at said threshold pressure is less than said first rated pressure;
- (h) wherein said chamber pressure is relievable in response to detection of said threshold pressure in said frac system, thereby causing said pressure differential to increase above said first rated pressure;
- (i) whereby fluid pressure from said frac system opens in sequence said first and second closures.

20. The pressure relief valve of claim 19, wherein said first and second sacrificial closures are a metal rupture disk, a frangible closure, or an extrudable closure.

21. The pressure relief valve of claim 19, wherein said valve is operably, connected to an electronic actuation system comprising:
- (a) a pressure detector adapted to measure fluid pressure in said frac system;
- (b) a normally shut valve controlling flow through said port; and
- (c) a digital controller adapted to receive signals from said detector corresponding to pressure in said frac system, to compare said pressure in said frac system to said threshold fluid pressure, and to send a signal to open said control valve in response to said pressure in said frac system exceeding said threshold fluid pressure, whereby pressure is relieved from said chamber.

22. The pressure relief valve of claim 19, wherein said valve comprises a port allowing inflow of fluid into said chamber and a source of pressurized fluid external to said frac system, said pressurized fluid source being in fluid communication with said inflow port.

* * * * *

UNITED STATES PATENT AND TRADEMARK OFFICE
CERTIFICATE OF CORRECTION

Page 1 of 1

PATENT NO. : 10,527,183 B1
APPLICATION NO. : 15/583056
DATED : January 7, 2020
INVENTOR(S) : Larry Mitchell Hill et al.

It is certified that error appears in the above-identified patent and that said Letters Patent is hereby corrected as shown below:

In the Claims

Column 24,
Line 11, in paragraph (e) of Claim 19, delete "a port allowing outflow of fluid into said chamber," and insert -- a port allowing outflow of fluid from said chamber, --.

Signed and Sealed this
Eleventh Day of February, 2020

Andrei Iancu
*Director of the United States Patent and Trademark Office*